(12) United States Patent
Chin

(10) Patent No.: US 7,974,883 B2
(45) Date of Patent: Jul. 5, 2011

(54) METHOD AND SYSTEM FOR PROVIDING ABSORBENT ARTICLES TO A CONSUMER

(75) Inventor: Toyna J. Chin, San Francisco, CA (US)

(73) Assignee: Hygeia Personal Care Products, Inc., San Francisco, CA (US)

( * ) Notice: Subject to any disclaimer, the term of this patent is extended or adjusted under 35 U.S.C. 154(b) by 1163 days.

(21) Appl. No.: 11/539,151

(22) Filed: Oct. 5, 2006

(65) Prior Publication Data

US 2007/0088623 A1    Apr. 19, 2007

Related U.S. Application Data

(60) Provisional application No. 60/724,954, filed on Oct. 6, 2005.

(51) Int. Cl.
*G06Q 30/00* (2006.01)
(52) U.S. Cl. .................................................... 705/26
(58) Field of Classification Search ............... 705/26, 705/27
See application file for complete search history.

(56) References Cited

U.S. PATENT DOCUMENTS

| 5,947,302 | A | 9/1999 | Miller |
| 6,093,027 | A | 7/2000 | Unger et al. |
| 6,368,113 | B1 | 4/2002 | Unger et al. |
| 6,679,705 | B2 | 1/2004 | Supinski et al. |
| 2003/0091969 | A1* | 5/2003 | Supinski et al. ............ 434/273 |
| 2006/0149570 | A1* | 7/2006 | McDaniel et al. ............... 705/1 |
| 2006/0167429 | A1* | 7/2006 | Denti et al. ............ 604/385.17 |
| 2007/0027404 | A1* | 2/2007 | Saini et al. ..................... 600/551 |

* cited by examiner

*Primary Examiner* — Mila Airapetian
(74) *Attorney, Agent, or Firm* — Levine Bagade Han LLP

(57) ABSTRACT

A system and method for providing kits of absorbent articles to consumers includes a selection tool that collects information about the consumer's cycle characteristics and use preferences and selects for the consumer a cycle kit of absorbent articles. An interactive ordering tool allows online purchase of a kit. An auto-send option provides monthly delivery of a cycle kit timed to coincide with onset of the consumer's menses. An information component provides use instructions and health and lifestyle information in different media, including from a web site. Different kit types include assortments of different types of feminine hygiene articles specific to particular profiles of cycle characteristics and use preferences, arranged in a package in a use sequence keyed to cycle progression. Other distribution channels in the system include both traditional and non-traditional brick-and-mortar retailers and institutional channels, such as dispensing machines. Refills, sample kits, custom kits and compacts are provided.

19 Claims, 21 Drawing Sheets

A

B

METHOD AND SYSTEM FOR PROVIDING ABSORBENT ARTICLES TO A CONSUMER

CROSS REFERENCE TO RELATED APPLICATIONS

This application claims benefit of U.S. provisional patent application Ser. No. 60/724,954, filed Oct. 6, 2005, the entirety of which is incorporated herein by this reference thereto.

BACKGROUND OF THE INVENTION

1. Field of the Invention

The invention relates to the field of personal care products. More particularly, the invention relates to a method and system for providing a kit of absorbent articles to a consumer.

2. Discussion of Related Art

Feminine hygiene products are often referred to as "absorbent articles" and are designed to absorb menses and other vaginal discharges. Absorbent articles are provided in various types such as sanitary napkins or pads, panty liners or shields, tampons and inter-labial devices, having different absorbency characteristics. Sanitary napkins, for example, are typically used to absorb heavy menstrual flows; panty liners or panty shields typically are used for lighter menstrual flows. Additionally, there are tampons which are inserted into the vagina and are provided in different absorbencies.

Women typically use only one product type, even though a single product type is usually insufficient to provide a woman with optimal absorbency protection throughout her menstrual period. In actuality, combinations of different product types (e.g. products of different thickness and/or length, tampons, wipes) can provide the woman with superior protection and comfort. A woman may actually require different product types in different settings or at different stages of her menstrual cycle. For example, at the beginning and end of her menses, a light-flow product such as a panty liner may be sufficient to absorb the menstrual flow, but during a heavy-flow period, the same woman may require a product such as a sanitary napkin or a tampon. However, current methods of distributing absorbent products fail to recognize that a woman may require several product types over the course of her menstrual period.

Even if a woman is aware that combining product types can improve her absorbency protection, absorbent articles having different uses or different levels of absorbent capacity are typically sold in separate packages, which is both inconvenient and costly for the consumer. Historically, young women have purchased their menstrual cycle products from a variety of providers in a variety of inconvenient, bulky packages.

Multi-packs of some feminine hygiene articles such as tampons do exist, but they consist of large packages of each type of product; for example, a multi-pack of various sizes of pads and tampons or of various types of tampons only. Thus, because a woman must still open the packs in order to remove just the items she needs, she is still subjected to the inconvenience and expense of purchasing and storing multiple packages of product. Furthermore, these packages can be fairly bulky and obvious and do not provide the user with attractive, youth and consumer-oriented packaging. Additionally, many young women find conventional distribution channels for absorbent articles unsatisfactory, requiring them to purchase multiple large packages of product in busy retail outlets such as grocery stores or large drugstores thereby sacrificing a considerable amount of privacy and discretion in order to purchase the products.

Restroom dispensers for feminine hygiene products are known, but they typically only dispense pads and/or tampons, offering little to the woman or girl who needs another type of product such as a panty liner. Additionally, restroom dispensers are typically stocked with dated, early-generation products, preventing the consumer from acquiring the most current products. Moreover, products vended from dispensers are often product overruns that have been sold to institutional distributors. Thus, the limited selection of product from restroom dispensers serves as an additional hindrance to accessing comprehensive, timely menstrual care.

Women of different ethnicities tend to have differing menstrual care needs and typically have product preferences that appear to be at least partly related to their ethnicity. Girls of non-white ethnicity are found to use feminine hygiene products in greater amounts than their white counterparts, for example. Asian-American and Hispanic-American girls significantly outrank whites as users and heavy users of sanitary pads and napkins, yet conventional methods of distributing absorbent products fail to take culturally and/or ethnically determined needs and preferences into account.

US Census Bureau estimates indicate that there are approximately 25 million girls between the ages of eight and nineteen, the largest generation ever for this particular demographic group. Young women, in particular, are dissatisfied with present feminine care products and view these brands and products as old-fashioned and not meeting their needs. They may feel insecure in buying feminine hygiene products, unsure of which product or products they should buy and use, at least partly because of the way they are currently packaged and configured.

A conventional assumption is that young women and girls learn about body development and reproductive functions such as ovulation and menstruation as a natural consequence of close, communicative mother-daughter relationships. Although this is sometimes true, it is not as common as generally thought. Moreover, as modern life continues to become busier and more complex, such interaction between generations becomes even less common. Thus, teens and girls, especially those who are approaching menarche, in addition to a greater range of product choices, also have a great need for education and counseling that informs and advises them on such topics as reproductive health and proper menstrual care.

A number of U.S. patents—U.S. Pat. No. 5,947,302, Method for dispensing absorbent articles; U.S. Pat. No. 6,093,027, Method for the selection of a feminine hygiene product system; U.S. Pat. No. 6,368,113 Method for the selection of a feminine hygiene product system; U.S. Pat. No. 6,679,705 B2, Method for the selection and use of a system of feminine hygiene products; and U.S. Patent Application Publication No. US 2003/0091969 Method for the selection and use of a system of feminine hygiene products—describe systems and methods for selecting and dispensing feminine hygiene products. While some of the above systems and methods provide point-of-sale and/or online selection systems that accept information from the consumer and issue a recommendation for a particular assortment of products, even kits of products, none of them contemplate anything other than conventional distribution methods and channels. None address the need of girls and young women for information and counseling concerning puberty, reproductive health and menstrual care and none contemplate culturally or ethically determined profiles of needs and preferences.

SUMMARY OF THE INVENTION

A system and method for providing a kit of absorbent articles to a consumer includes a selection tool that collects information about the consumer's cycle characteristics and use preferences and, using the information, selects for the consumer a cycle kit of absorbent articles. An interactive ordering tool allows online purchase of a kit. An auto-send option provides monthly delivery of a cycle kit timed to coincide with onset of the consumer's menses. An information component provides use instructions and health and lifestyle information in different media, including from a web site. Different kit types include assortments of different types of feminine hygiene articles specific to particular profiles of cycle characteristics and use preferences, arranged in a package in a use sequence keyed to cycle progression. Other distribution channels in the system include both traditional and non-traditional brick-and-mortar retailers, and institutional channels, such as dispensing machines. Refills, sample kits, custom kits and compacts are also provided.

DETAILED DESCRIPTION OF THE INVENTION

A system and method for providing a kit of absorbent articles to a consumer includes a selection tool that collects information about the consumer's cycle characteristics and use preferences and, using the information, selects for the consumer a cycle kit of absorbent articles. An interactive ordering tool allows online purchase of a kit. An auto-send option provides monthly delivery of a cycle kit timed to coincide with onset of the consumer's menses. An information component provides use instructions and health and lifestyle information in different media, including from a web site. Different kit types include assortments of different types of feminine hygiene articles specific to particular profiles of cycle characteristics and use preferences, arranged in a package in a use sequence keyed to cycle progression. Other distribution channels in the system include both traditional and non-traditional brick-and-mortar retailers and institutional channels, such as dispensing machines. Refills, sample kits, custom kits and compacts are also provided.

The invention recognizes that feminine hygiene products are conventionally viewed as products of necessity and that conventional methods of distributing such products reflect this status. Typically, feminine hygiene products are sold in large, inconvenient packages in the feminine hygiene aisles of drugstores, grocery stores and 'big-box' discount retailers. Emergency or single use items are typically found in institutional venues such as malls, schools and offices. Packages are embellished with surface art that evokes a medical or pharmaceutical association. One embodiment of the invention provides a method of distributing absorbent articles that associates feminine hygiene articles with beauty, fashion, style and fun. To this end, the invention, in addition to conventional distribution channels, distributes kits of absorbent articles through non-traditional channels: the Internet and beauty and fashion retailers, for example. Such retailers may include high-end clothing retailers, in particular retailers of high-fashion lingerie and sleepwear. Such retailers may also include beauty retailers, in particular retailers of high-end cosmetics, skin care and hair care products.

Figure 1:
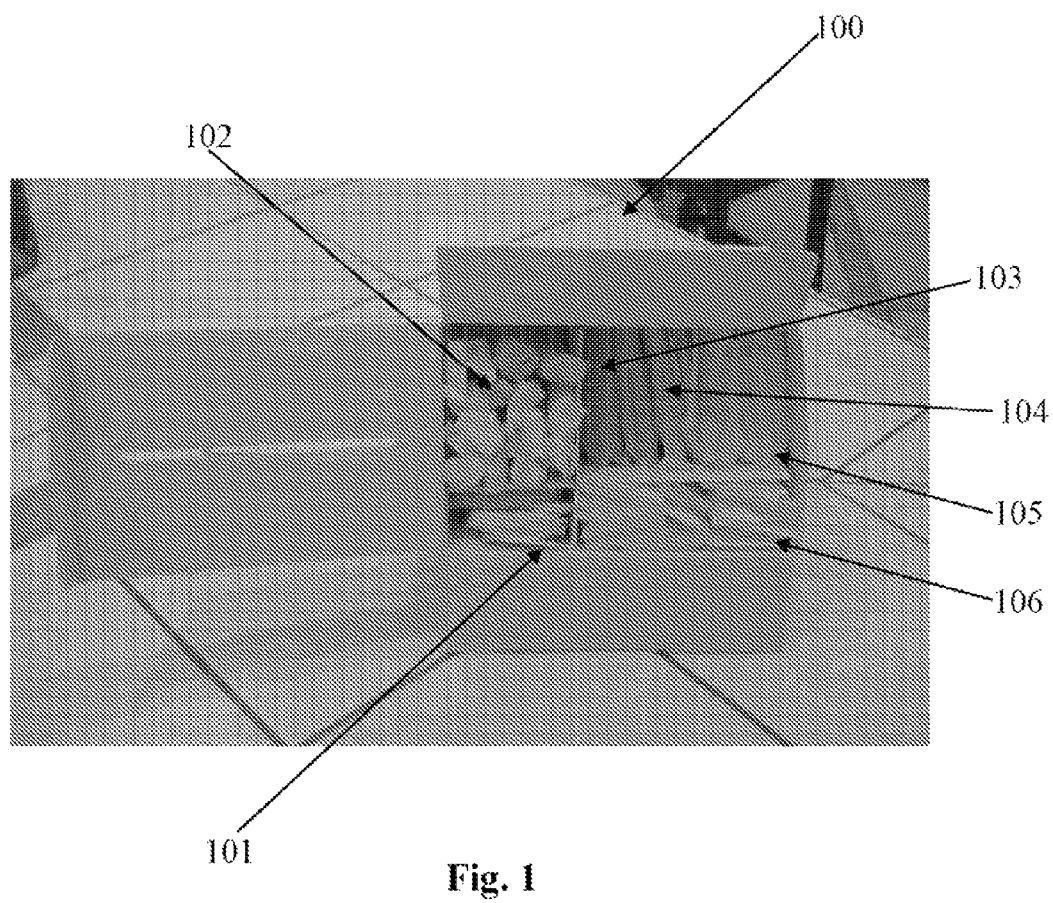
FIG. 1 shows a kit of absorbent articles that includes a plurality of different article types within a package, wherein the articles are arranged in the package in a use sequence keyed to typical progression of a predetermined menstrual cycle profile.

Referring now to FIG. 1, in one embodiment of the invention, a cycle kit 100 comprises a package 200 that contains a plurality of absorbent articles, feminine hygiene articles or catamenial devices. As shown in FIG. 1, an embodiment of the cycle kit provides a system for use within the package 200, wherein the products are arranged in the package in an order that maps to the sequence of use of the products during the normal course of a young woman's menstrual cycle. For example, as shown in FIG. 1, the products are arranged from left to right, clockwise based on which products are typically used first in a cycle kit for menses. The arrangement shown, however, is intended only to illustrate the principles of the invention and is not to be interpreted as a limitation of the invention.

As shown, the package is sectioned into compartments. In the upper left compartment is placed a predetermined number of tampons. The rationale for placing the tampons in this position is that, in general, a tampon is the most suitable product for a young woman to use at the onset of her menstrual period. At period onset, the menstrual flow tends to be light and thus is amenable to control using a tampon. In one embodiment of the invention, different kit types are provided to satisfy different profiles of cycle characteristics and use preferences. Thus, in different kit types, the number and type of products provided is carefully determined based on the profile the kit is designed to serve.

An additional factor in configuring the product mix in each of the kit types is a young woman's ethnicity. Data suggest that women of different ethnic groups have product preferences and patterns of use that tend to be associated with their ethnic group. For example, it is known that African-Americans and whites tend to favor tampons, while Asians and Hispanics tend to favor sanitary pads. It is also known that non-white women tend to use greater amounts of product than whites. Thus, ethnically-determined preferences and use patterns are a significant factor in determining an optimal product mix for a single kit type.

As above, the kit 100 may include a predetermined number of tampons in different absorbencies. As the young woman's cycle progresses, her flow increases, necessitating a product with greater absorbent capacity.

The kit 100, in the upper right compartment of the package includes a selection of different types 103-105 of sanitary pads, or sanitary napkins as they are commonly known. Typically, sanitary pads can be used at various stages of the young woman's cycle, including at night. As with the tampons, the selection of weights and sizes is carefully determined to accommodate a particular profile.

In the lower right compartment of the package are provided a plurality of panty liners. At a later stage of the cycle, the menstrual flow is decreasing and the young woman needs less protection. Thus, a panty liner may be optimal at a later stage of the menstrual cycle. Panty liners can additionally be combined with tampons to provide extra protection against leakage. As with other products, the type and number of panty liner is carefully predetermined according to the cycle kit type.

Finally, in the lower left compartment are found a plurality of thong shields 101. As with panty liners, thong shields can also be used with tampons to provide extra protection against leakage or they can be used later in the cycle to provide protection when the menstrual flow is beginning to end.

The particular package type and the product selection is exemplary. For example, kits consisting of all tampons or all sanitary pads are within the scope of the invention. The arrangement of products within the package as described above is also exemplary. For example, the products could be arranged counter-clockwise or in a single row. Any arrangement of product within the package that is designed to instruct a young woman who is unfamiliar with the selection and use of feminine hygiene products in the proper selection of product for a particular stage of her menstrual period is within the scope of the invention.

The kit additionally can contain other elements: for example, packaged toilettes for personal cleansing, an over-the-counter (OTC) antifungal agent, interlabial devices and other accessory products.

Thus, the invention achieves full and complete sanitary protection for the user, discretion and appeal in the packaging appearance, efficiencies in marketing and distribution, materials and manufacturing cost, embodied in a cycle kit.

As briefly mentioned above, an additional aspect of the cycle kit is its information component. It is known that girls are often ill-prepared to face the onset of puberty and the approach of their first period. The cycle kit provides the necessary educational material about puberty as well as all the necessary products needed for a girl's first menstrual cycle. In addition to the product arrangement within the package, a booklet of user-friendly directions and information are provided within the kit. Additionally, a multi-media program of information and instruction is provided in conjunction with purchase of the cycle kit.

An advantage for such a packaging combination is that it conveniently contains all the products a female would need to feel completely protected during a menstrual cycle. The cycle kit with its combination of products allows the user to experience substantially a 100% chance of not having to buy extra products during her menses without having many different boxes in various stages of use at any one time.

Figure 2:
FIG. 2 shows a first view of the package of FIG. 1.
Figure 3:
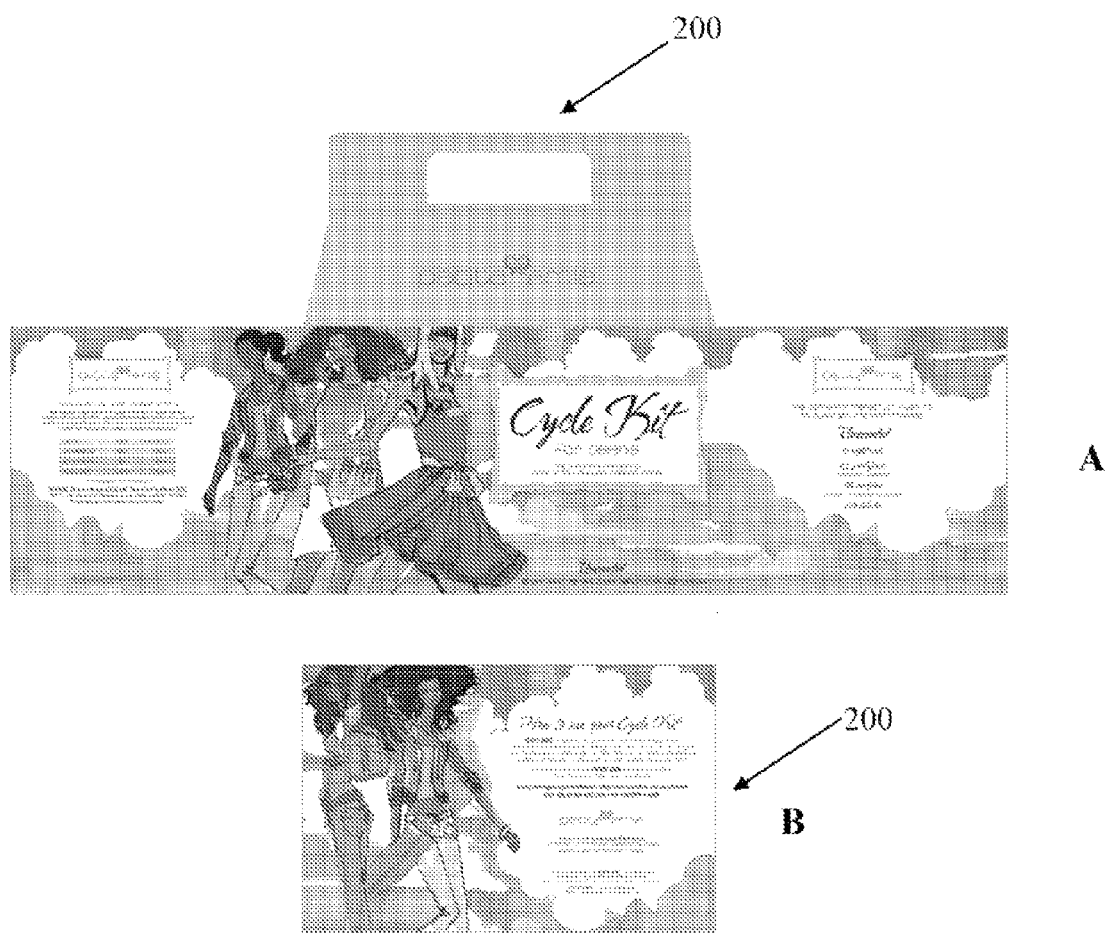
FIGS. 3a and b provide second and third views of the package of FIG. 1, in particular, the package art.

Turning now to FIGS. 2 and 3, multiple views of the package 200 are shown. The package 200 is fabricated from a suitable material, for example, package-weight cardboard. Other embodiments of the invention include other package types such as a carton or a soft-sided package. The package is provided with a carrying handle and readily opens from the top, allowing the consumer to easily withdraw product. As shown in FIGS. 2 and 3, an important feature of the package is its surface art. The package is embellished with surface art specifically created to appeal to girls and young teens, conveying an image of fun and glamour. Additionally, the package art is designed to establish an association of the cycle kit with a brand.

An embodiment of the invention provides a custom kit, wherein the product assortment is customized to accommodate the individual needs of a particular woman.

An embodiment of the invention also provides refills, wherein a young woman can supplement the cycle kit in the event that her need exceeds the amount of product provided in the cycle kit. The refills provide girls and teens with the opportunity to purchase additional product to be used with and/or accompany their cycle kits, particularly products such as pads, panty liner, tampons and toilettes. A girl or teen's menstrual cycle is typically characterized by initial light flow, which subsequently increases and finally tapers off to the end of the period. Young women tend to have different levels of overall menstrual flow throughout each cycle. Thus, refills are provided to accommodate unpredictable variations in flow from one cycle to the next. Typically, refills are distributed through traditional and non-traditional brick-and-mortar retailers.

Figure 4:
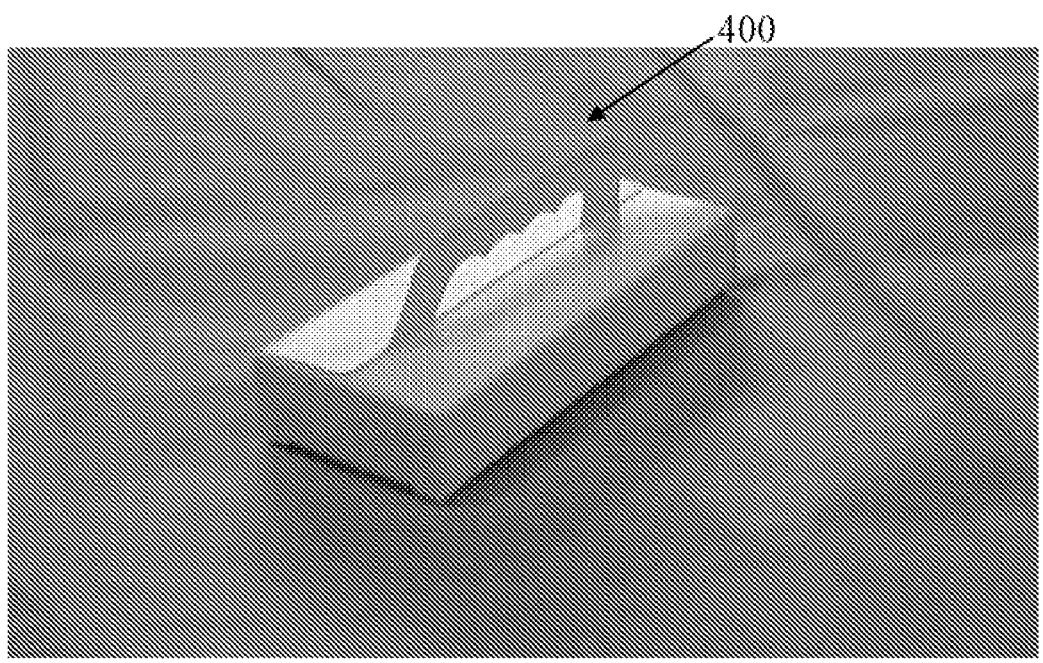
FIG. 4 shows a package assembly for a single-use sample kit.

An embodiment of the invention, shown in FIG. 4, provides a sample kit, containing enough product for a single use. The sample kit is provided for the eventuality that a young woman will have forgotten to bring supplies with her from home, and needs to change while at school, work or at a social function. Typically, the sample kit is distributed free of charge as a product sample through a variety of channels.

Figure 5:
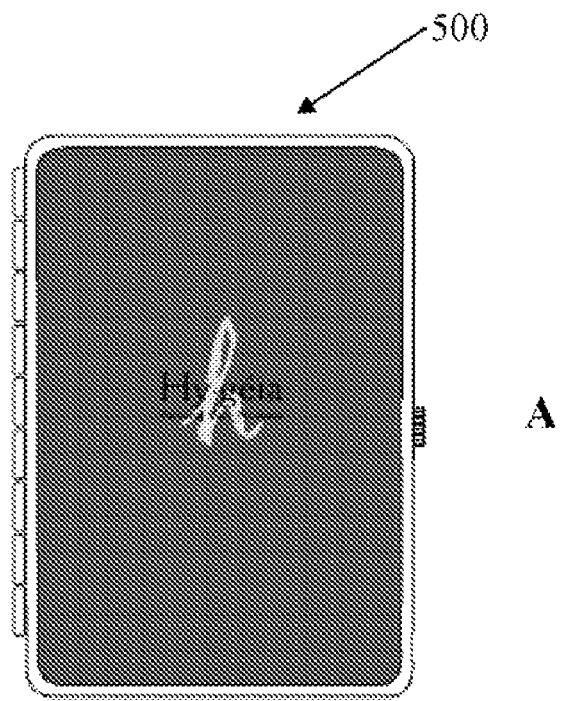
FIGS. 5a and b show first and second views of a compact for absorbent articles.
Figure 5:
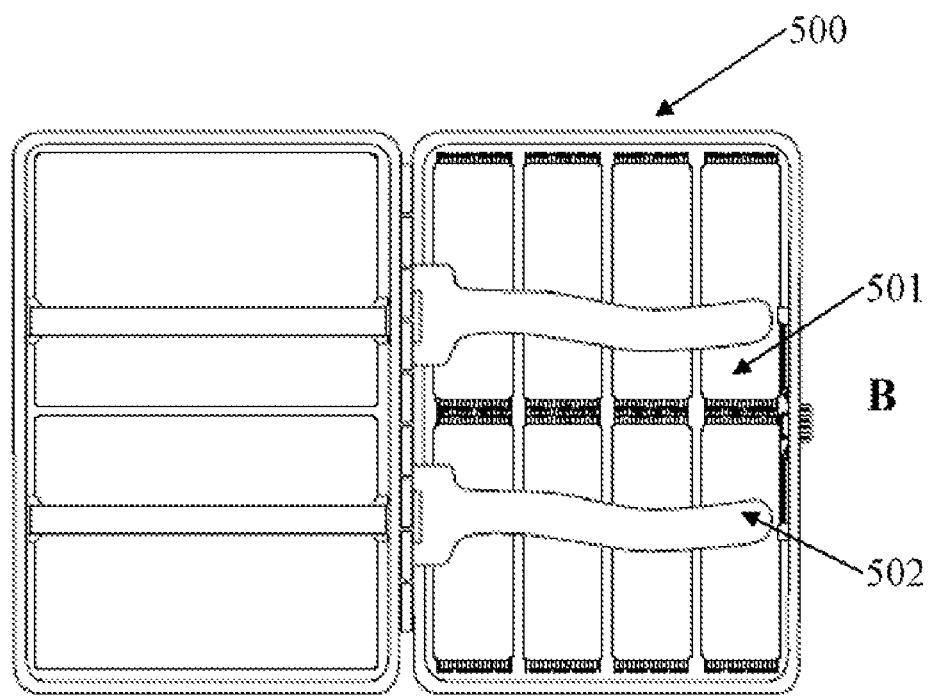

As shown in FIG. 5, in an embodiment of the invention, a cycle compact 500 provides young women with a discreet and stylish package for carrying with them a small supply of cycle kit supplies, typically a day's worth. FIG. 5A shows a first view of a cycle kit. Shown is a flat case that resembles a cigarette case or a makeup compact. In one embodiment, the case lid is hinged and is also provided with a latch so that the lid remains securely fastened in the closed position when the woman is not actively using the compact.

As shown in FIG. 5A, the case may be embellished with a logo, or alternately a monogram or an ornamental design. The design may be a custom design selected by the consumer, for example.

Different fabrication materials are suitable for the cycle compact. In one embodiment of the invention, the cycle compact case is fabricated from a precious or semi-precious metal such as gold or sterling silver. In another embodiment of the invention, the case may be fabricated from a durable polymer resin. In other embodiments, the case may be fabricated from mineral substances such as soapstone or alabaster or from such naturally occurring substances as mother-of-pearl or bone.

In another embodiment, the compact is provided in different materials at different price points. Other materials are possible which accomplish the purpose of providing a case for carrying cycle kit supplies that is discrete and stylish. Other case configurations and shapes will occur to the ordinarily-skilled practitioner and are consistent with the spirit and scope of the invention FIG. 5B shows a second view of the cycle compact 500 wherein the lidded case is opened, revealing the arrangement of the cycle kit supplies 501 within the case. An embodiment of the cycle compact includes one or more retaining straps 502, which, when fastened, secure the cycle kit supplies in place. An embodiment of the cycle compact provides a case wherein the case lid is also dimensioned to receive and store cycle kit supplies and is also equipped with retaining straps to secure the supplies.

In use, the consumer, typically an adolescent woman replenishes the cycle compact with supplies in privacy at home. She then carries the cycle compact with her to school, work or play and is able to change tampon, pad, panty liner or toilette with relative discretion as the need arises.

The invention recognizes that young girls may be frightened by the approach of puberty and the onset of menstruation and that they may not know where to turn for reassurance, information and guidance. Additionally, the invention recognizes that even adolescent women who have gone through their first periods still have a great need for information and guidance on topics such as menstrual care and reproductive health. Accordingly, an embodiment of the invention includes a private, multimedia learning program through which young women receive such guidance and advice. One aspect of this learning program is an informational booklet included in each cycle kit.

Figure 6:
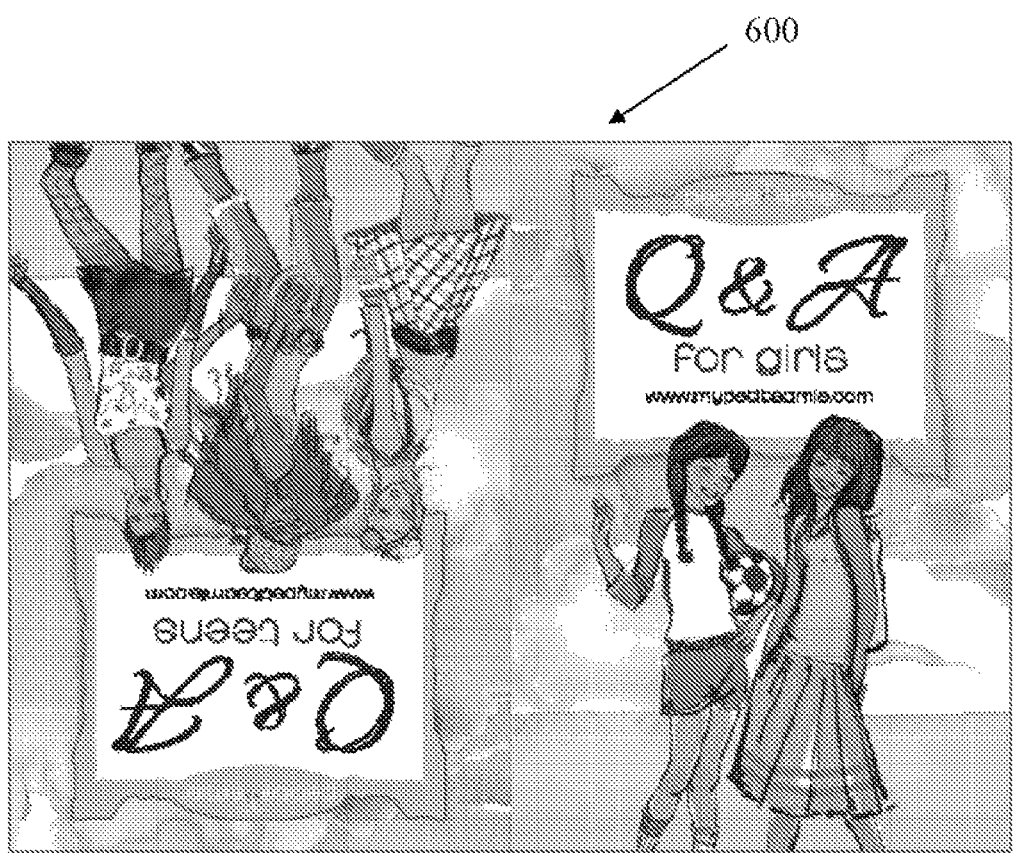
FIG. 6 illustrates the cover of an information booklet included with any of the packages of FIGS. 1-3.

FIG. 6 shows a view of the cover of the informational booklet 600 included in the cycle kit. The invention recognizes that the information needs of a young girl approaching puberty and a young woman who has already entered puberty may be different. Therefore, the information booklet includes segments targeted to each group of girls. In one embodiment of the invention, each segment is a standalone body of information targeted to each group, although all segments are included within a single, reversible booklet. As shown in FIG. 6, one half of the booklet contains the segment targeted to prepubescent girls and the other half contains the segment targeted to older girls. As shown, the covers for each half are embellished with art designed to appeal to the targeted age group. The cover design shown in FIG. 6 is exemplary only. An embodiment of the invention provides entirely separate booklets for each age group.

The following paragraphs describe a method of selecting a kit of absorbent articles for a young girl approaching her first menstrual period. Such method is embodied in the description provided by the informational segment for young girls from the information booklet described above.

An introductory step provides a description of a cycle kit configured especially for girls experiencing their first menstrual period:

"My First Cycle Kit™ for Girls is designed for girls just like you, and has all the things you need to get through your first period. Inside each Kit, you'll also find a form to fill out to get the fun-to-read, FREE guide about your period, The Period Book. It has answers to all the questions you have but may be afraid to ask.

15 Tampons: 10 Regular Absorbency—Use on light flow days at the beginning and end of your period. Its smooth, pearlized plastic applicator makes it a cinch to use. 5 Super Absorbency—Ideal for heavier flow days, usually on the second or third day of your period. These have the same cool applicator as the "Regulars" have.

5 Ultra Skinny Overnight Pads with wings—Overnight pad provides full-size protection with Ultra Skinny comfort. Wings protect against side leakage and keep pad securely in place. Individually wrapped and folded.

5 Panty liners—Individually folded and wrapped for convenient, portable protection. Ideal for your tampon backup when you're wearing your "granny" panties.

5 Thong Liners—Thin for a comfortable feeling. Ideal for your tampon backup with your thong panties.

20 Toilettes—Individually wrapped. Perfect for on-the-go convenience. Use during your period after or in place of toilet paper for a fresh, clean feeling.

Description: My First Cycle Kit™ for Girls is designed for girls just like you, and has all the things you need to get you through your first period. Inside each Kit, you'll also find a form to fill out to get the fun-to-read, FREE guide about your period, The Period Book. It has all the answers to the questions you may be too embarrassed to ask. All Cycle Kit items are Unscented or Lightly Scented.

There follows a step of describing menstruation in a question-and-answer format, attempting to anticipate the questions most likely to occur:

"Q: What is a period?
A: Your period is the time of month when fluid containing blood flows from the uterus and out through the vagina.
Q: When will I start my period?
A: Most girls start their periods between the ages of 9 and 15, with some as early as 7. Others get it later, at 18 or 19.
Q: What do I do when I get my First period?
A: First, don't panic—you're NOT dying! Go to the nearest bathroom to clean up. If you don't have your Petite Amie products with you, fold up some toilet paper and place in your underwear (in the crotch, where it has a double layer of cloth) for temporary protection. Ask your mom, older sister, school nurse or other adult you trust for help.
The text then provides a description of sanitary pads and their proper use:
"Q: What are a sanitary pad and a panty liner?
A: A sanitary pad (or "pad") is designed to fit securely in the crotch of your underwear to absorb period flow. Wear pads on heavier period flow days and at night. A panty liner (or "liner") is just a lighter, thinner pad. You can wear it on lighter days of your period, or combined with tampons to absorb any extra fluid your tampon may not absorb.
Q: How do I use a pad or liner?
A: Remove wrapper and take off paper strips from the adhesive areas of the pad/liner. Position adhesive to stick to the crotch of your panties, with the soft side facing up towards your body.
If you have pads or liners with wings, wrap the wings around the crotch of your panties. Check every 3-4 hrs to make sure you don't have any leaking fluid, or to change. Check more frequently if flow is heavy, especially in the first few days."

There follows a step of describing tampons and their proper use:

"Q: What is a tampon?

A: A tampon is another feminine hygiene product for absorbing period flow. Instead of sticking it onto your panties, you insert it inside the vagina.

Q: How do I put in a tampon for the First time?

A: For many, using a tampon may be scary at first. It's much easier to use a tampon when you're relaxed. Many girls need a few tries before they can comfortably insert a tampon. But don't worry, with practice, you'll be fine. Just follow these steps:

GET TO KNOW YOUR BODY

First, know your body—there's nothing to be ashamed of, so relax! The diagrams below show an illustration of your pelvic area and genitals. Get a mirror and go to a place with privacy. Females have three openings: the urethra (where urine comes out), the vagina (where period flow and babies come out) and the anus (where #2 comes from).

The middle opening, the vagina, is where you place your tampon. Don't worry about inserting the tampon in the wrong place—the vagina is the largest opening. BEFORE USING THE TAMPON Wash your hands, and skip the hand lotion. Get into a comfy position that makes it easy to reach your vagina, such as when sitting or squatting over the toilet; laying on your back on a bed (make sure to put a towel down so you don't stain anything); or standing with one leg up on a chair or the toilet.

TAMPON INSERTION

Remove the wrapper. Hold the applicator in one hand while spreading the labia, or lips, of your vagina with the other. Insert the tip of the applicator at an angle toward the back of your body. Push the applicator in until the top half is in. Then push on the lower half of the applicator tube with your forefinger. This will push the tampon out of the applicator, and up into your vagina. Pull out the applicator, wrap it in toilet paper or the wrapper and put in the trash. DON'T FLUSH THE APPLICATOR DOWN the TOILET! You may also want to add a liner during the first days of your period. It will catch any overflow the tampon doesn't absorb. Try a little lubricant on the tip of the applicator to make it go in easier. Do not use a petroleum-based lubricant, and never use lotion for this purpose!

CHECK FIT

The tampon string should now hang down between your thighs. Tuck it up and back towards your butt so it doesn't peek out of your panties or swimsuit. If the tampon is in properly, you shouldn't feel it. But if it feels uncomfortable, it may be in crooked, or not in far enough. Use your index finger to push it in a little more. Or remove, throw away (DO NOT FLUSH), and start over with a new tampon. You can also use a lower absorbency option.

TO REMOVE

Check the tampon about 4 hours after inserting to see if there's blood on the string or your liner. If so, it's probably time to change it. You'll need to change your tampon based on how heavy your period is, especially during the first couple of days. When your period is lighter, you'll still have to remove the tampon every 4-8 hours to avoid getting Toxic Shock Syndrome (Be sure to read the TSS section of this booklet, for more important information about TSS). To remove, relax and pull the tampon string gently but firmly at the same angle used when inserting, and not straight down. It should come out easily.* You may want to practice getting the hang of using a tampon, i.e., practicing pushing it through the applicator, etc.

Q: Which is better, a tampon or pad?

A: It depends on what you're comfortable with. Both are safe and reliable if used correctly. Try pads and tampons together on heavier flow days. If you play sports or swim, a tampon might be easier and won't show. Some girls feel cleaner when wearing a tampon compared to a pad.

Test both to figure out what's best for you.

Q: How often do I change my tampon or pad?

A: After a while, your pad and/or tampon absorb the maximum amount of blood they were designed to hold, so they'll need changing. As a beginner, you should go to the bathroom often to check on your tampon and pad to make sure it doesn't leak. Changing it about every 4 hours is best. Usually during the first 1-3 days, when your period is heaviest, your tampon or pad will probably need more frequent changing.

Q: How do I know what size tampon or pad to use?

A: It will depend on your flow. Use the most absorbent tampon or pad on your heaviest flow days and the least absorbent on your light days.

Q: Who or what is the FDA (Food and Drug Administration)?

A: The FDA is a U.S. government agency responsible for protecting the public by assuring that drugs, devices, food and certain cosmetics are safe, secure and effective. It regulates tampons to ensure that tampon design and materials are safe, and bases its review of tampons and other feminine hygiene products on strict safety standards.

Tampon manufacturers must conduct safety studies, and their products must pass the FDA's review and clearance before they can be sold. The FDA also regulates tampon absorbency ratings like those printed on our packaging (see middle section of book on TSS for absorbency range chart). For more information about your period, don't forget to log on to www.mypetiteamie.com. IMPORTANT: PLEASE SEE THE SECTION ON TOXIC SHOCK SYNDROME (TSS) in the middle section of this booklet FOR SOME IMPORTANT FACTS ABOUT MENSTRUAL TSS."

There follows a step of describing toxic shock syndrome, including (1) What it is; (2) the most common symptoms; (3) what to do if symptoms develop (4) self-care to avoid TSS; and (5) proper product selection and use to avoid TSS:

"Following is information you should know about Toxic Shock Syndrome:

TSS is caused by the common and usually harmless bacteria S. aureus, which often hangs around on the skin, and in the nose, armpit, groin or vagina.

About ⅓ of the population carries the bacteria that causes TSS without a clue or a problem. Sometimes TSS is caused by infections following surgery, insect bites or burns. Using any tampon, whether cotton or rayon of any absorbency may increase TSS risk compared to using pads.

Q: Who gets TSS?

A: TSS is not picky—it affects men, women and children. For a tiny number of people, certain types of the bacteria create TSS-causing toxins. Most people have the antibodies to fight off the toxins, while a few don't. But this is really rare.

Women under 30, especially teenagers, are at higher risk for TSS because some may not yet have the antibodies to fight the toxin.

Once you've had TSS, you are more likely to get it again, compared to someone who never had it. So if a doctor has told you that you had TSS, use pads until he/she says it's OK to use tampons.

MENSTRUAL TSS & SYMPTOMS

About half of the reported cases are "Menstrual TSS" and associated with women using tampons. Menstrual TSS can be hard to identify because it can imitate the flu, and not all TSS cases are alike.

Symptoms may include sudden high fever (102 Degrees F. or more), accompanied by vomiting, diarrhea, dizziness, fainting, and/or a sunburn-like rash, during or right after your period. All symptoms are not always present.

These symptoms usually appear very quickly and are often severe. Other signs may be aching muscles and joints, eye redness, sore throat and weakness. One or 2 weeks after first symptoms appear, flaking and peeling skin occurs, mainly on palms and soles of feet.

WHAT TO DO ABOUT MENSTRUAL TSS SYMPTOMS

CONTACT YOUR DOCTOR IMMEDIATELY! If you have TSS and do not receive immediate medical care, you may be at risk of dying.

Remove your tampon immediately and stop using.

Tell the doctor that you are menstruating and you were wearing a tampon. If your doctor believes you have TSS, you will probably have to go to the hospital for emergency care. With proper treatment, patients usually recover in two to three weeks.

TAMPON ABSORBENCY AND MENSTRUAL TSS RISK

Studies by the Centers for Disease Control (CDC) and other organizations have shown that higher absorbency tampons may increase menstrual TSS risk because they can be left in longer, which may encourage bacteria growth.

To reduce your risk of TSS, the FDA recommends using a tampon with the lowest absorbency possible for handling your flow. The risk of menstrual TSS can be reduced by not using tampons at all, or by alternating with pads.

TABLE 1

TAMPON ABSORBENCY RATES

| FLOW VOLUME | TAMPON TYPE | APPROX. AMOUNT ABSORBED |
| --- | --- | --- |
| Light Flow | Slender (lite) | 6 grams or less |
| Light-to-medium | Regular | 6-9 grams |
| Medium-to-heavy | Super | 9-12 grams |
| Very heavy | Super plus | 12-15 grams |

This absorbency range chart shows you how many grams of fluid each tampon type will absorb, and the corresponding label for each range.

A tampon's Absorbency Rate is how fast it soaks up menstrual flow; it is measured in grams of fluid.

Tampons are available in four absorbency ranges (refer to the absorbency rating chart above). Under a new system adopted by all tampon manufacturers, tampons within a given range will have the same absorbency label. For example, all tampons labeled "Regular" will absorb the same amount (6-9 grams).

Match absorbency to your flow—and always use the minimum absorbency to meet your needs. (This may reduce TSS risk.)

Because your period varies from day to day, you may want to use Regular absorbency on days when you have light flow. On heavy days you might want Super absorbency.

If your tampon has to be changed before 4 hours passes, maybe try a higher absorbency.

You usually don't need high absorbency tampons when your period is almost over."

There follows a step of explaining how to select the most appropriate product from the kit for each stage of the girl's menstrual period.

"15 Tampons:

10 Regular Absorbency—Use on light flow days at the beginning and end of your period. Its smooth, pearlized plastic applicator makes it a cinch to use.

5 Super Absorbency—Ideal for heavier flow days, usually on the second or third day of your period. These have the same cool applicator as the "Regulars" have.

5 Ultra Skinny Overnight Pads with wings—Overnight pad provides full-size protection with Ultra Skinny comfort. Wings protect against side leakage and keep pad securely in place. Individually wrapped and folded.

5 Panty liners—Individually folded and wrapped for convenient, portable protection. Ideal for your tampon backup when you're wearing your "granny" panties.

5 Thong Liners—Thin for a comfortable feeling. Ideal for your tampon backup with your thong panties.

20 Toilettes—Individually wrapped. Perfect for on-the-go convenience. Use during your period after or in place of toilet paper for a fresh, clean feeling.

Description: My First Cycle Kit™ for Girls is designed for girls just like you, and has all the things you need to get you through your first period. Inside each Kit, you'll also find a form to fill out to get the fun-to-read, FREE guide about your period, The Period Book. It has all the answers to the questions you may be too embarrassed to ask. All Cycle Kit items are Unscented or Lightly Scented."

The preceding description of the cycle kit for girls is exemplary only. Other kits having other product configurations are consistent with the spirit and scope of the invention.

The following paragraphs describe a method of selecting a kit of absorbent articles for young women who have entered puberty and are past their first menstrual period. At least a portion of the steps of the method are embodied in the description provided by the informational segment for teens from the information booklet described above.

As described in greater detail below, cycle kits for older girls are provided in various types configured to accommodate different profiles that are based on any of cycle characteristics, use preferences, ethnicity, size and weight, and activity level. Accordingly, prior to recommending a particular cycle kit for a young woman, information is gathered concerning at least the young woman's cycle characteristics and use preferences. There exists a variety of methods of collecting the information: the information may be collected during a face-to-face interview with a healthcare practitioner, such as the young woman's physician or a school nurse. Alternatively, the information may be collected by having the young woman fill out a questionnaire and evaluating her answers.

An embodiment of the invention includes a software selection tool incorporating an expert system that evaluates the young woman's input and recommends the cycle kit configured to satisfy her needs and preferences most closely. In one embodiment, the expert system is a computer program made up of a set of rules that analyze the cycle characteristic and use preference information provided by the young woman and recommend a particular product based on the input.

The knowledge necessary to select the proper kit is expressed in the software in terms of a sequence of rules that recommend to the consumer which product to use given a particular profile of cycle characteristics and use preferences. In one embodiment of the invention, the expert software runs on an interactive point-of-sale terminal. In another embodiment of the invention, the expert system is embodied as an interactive selection tool provided on a web site over a publicly-accessible data transmission network such as the Internet. Further details of the selection tool are provided infra.

After the information is provided by the young woman, it is evaluated and a cycle kit selected for her. As described below, different cycle kits are configured to satisfy particular profiles of cycle characteristics and use preferences.

The following paragraphs, excerpted from the segment of the above information booklet targeted to older girls, embody additional steps in a method of selecting kit of absorbent articles for a consumer.

Immediately following is a description of various cycle kits configured for various profiles. The descriptions given below are not intended to limit the invention; rather they are illustrative in nature. Other kits of absorbent articles configured to a plurality of profiles are within the scope of the invention.

Cycle KIT 1

"What's Inside:

20 Tampons:
  12 Regular Absorbency—Use on light flow days at the beginning and end of your period. Its smooth, pearlized plastic applicator makes it a cinch to use.
  8 Super Absorbency—Ideal for heavier flow days, usually on the second or third day of your period. These have the same cool applicator as the "Regulars" have.
7 Panty liners—Individually folded and wrapped for convenient, portable protection. Ideal for your tampon backup when you're wearing your "granny" panties.
7 Thong Liners—Thin for a comfortable feeling. Ideal for your tampon backup with your thong panties.
20 Toilettes—Individually wrapped. Perfect for on-the-go convenience. Use during your period after or in place of toilet paper for a fresh, clean feeling.
Description: Cycle Kit™ for Teens is designed for on-the-move girls like you—they're the one-stop-shop for your period, all tucked inside a cool, convenient kit. You'll always be prepared for whatever your period brings you! Our Cycle Kits are designed for different body types, flow amounts and personal preferences—there's one for you! All Cycle Kit items are Unscented or Lightly Scented."

Cycle Kit II

"15 Tampons:
  10 Regular Absorbency—Use on light flow days at the beginning and end of your period. Its smooth, pearlized plastic applicator makes it a cinch to use.
  5 Super Absorbency—Ideal for heavier flow days, usually on the second or third day of your period. These have the same cool applicator as the "Regulars" have.
Ultra Skinny Overnight Pads with wings—Overnight pad provides full-size protection with Ultra Skinny comfort. Wings protect against side leakage and keep pad securely in place. Individually wrapped and folded.
5 Panty liners—Individually folded and wrapped for convenient, portable protection. Ideal for your tampon backup when you're wearing your "granny" panties.
5 Thong Liners—Thin for a comfortable feeling. Ideal for your tampon backup with your thong panties.
20 Toilettes—Individually wrapped. Perfect for on-the-go convenience. Use during your period after or in place of toilet paper for a fresh, clean feeling.
Description: Cycle Kit™ for Teens is designed for on-the-move girls like you—they're the one-stop-shop for your period, all tucked inside a cool, convenient kit. You'll always be prepared for whatever your period brings you! Our Cycle Kits are designed for different body types, flow amounts and personal preferences—there's one for you! All Cycle Kit items are Unscented or Lightly Scented."

Cycle Kit III

"15 Tampons:
  10 Regular Absorbency—Use on light flow days at the beginning and end of your period. Its smooth, pearlized plastic applicator makes it a cinch to use.
  5 Super Absorbency—Ideal for heavier flow days, usually on the second or third day of your period. These have the same cool applicator as the "Regulars" have.
Ultra Skinny Overnight Pads with wings—Overnight pad provides full-size protection with Ultra Skinny comfort. Wings protect against side leakage and keep pad securely in place. Individually wrapped and folded.
5 Panty liners—Individually folded and wrapped for convenient, portable protection. Ideal for your tampon backup when you're wearing your "granny" panties.
5 Thong Liners—Thin for a comfortable feeling. Ideal for your tampon backup with your thong panties.
20 Toilettes—Individually wrapped. Perfect for on-the-go convenience. Use during your period after or in place of toilet paper for a fresh, clean feeling.
Description: Cycle Kit™ for Teens is designed for on-the-move girls like you—they're the one-stop-shop for your period, all tucked inside a cool, convenient kit. You'll always be prepared for whatever your period brings you! Our Cycle Kits are designed for different body types, flow amounts and personal preferences—there's one for you! All Cycle Kit items are Unscented or Lightly Scented."

The preceding descriptions of cycle kits are provided for illustrative purposes and are not meant to limit the invention.

A cycle kit having been recommended, there follows a step of instructing the young woman in the proper use of tampons, sanitary pads, panty liners and thong liners:

"Tampons, like pads, are products designed to absorb menstrual flow. They come in all different sizes and absorbencies. Tampons are made of soft cotton or rayon-cotton blend fibers pressed together to form a cylinder-like shape, so that they can fit into the opening of the vagina. A tampon absorbs your menstrual flow, or blood, before it has a chance to leave the body.

TAMPONS & FDA (FOOD AND DRUG ADMINISTRATION)

The Food & Drug Administration (FDA) is a U.S. government agency that regulates tampons with strict health safety standards to ensure that their design and materials are safe. The FDA makes tampon manufacturers run tons of safety studies, and won't allow the sale of their products without them passing a brutal set of tests. The FDA also sets the rules for tampon absorbency ratings (see middle section of book on TSS for absorbency range chart). IMPORTANT: PLEASE SEE THE SECTION ON TOXIC SHOCK SYNDROME (TSS) also in the middle section of this booklet FOR SOME IMPORTANT FACTS ABOUT MENSTRUAL TSS.

TAMPONS & VIRGINS

Tampons can be used by virgins without "de-virginizing" them. Most women are born with a hymen, a thin piece of skin just inside the vaginal opening that's not essential to life or health. The hymen usually has at least one opening for the menses to flow out of. Some girls are born without a hymen, which is perfectly normal! A girl can tear her hymen during non-sexual activities like sports, horseback riding, etc. She often has no idea she's torn her hymen, since there may be no blood or pain.

There is NO medical/scientific proof that tampons make the vagina get larger. The vaginal canal is made of flexible, muscular walls that expand and shrink as needed (think about how babies come out!).

Petite Amie tampons are available in two absorbency ranges: Regular and Super.

TAMPON INSERTION

It's much easier to insert a tampon when you're relaxed. Don't lotion your hands before you put a tampon in. It makes hands slippery and can irritate the delicate skin down there."

There follows a step of providing advice about personal care and hygiene during the young woman's period:

"PERIOD POINTERS

Skin Savers
  Avoid greasy foods.
  Keep skin clean and steer clear of greasy/heavy makeup.
Exercise, Cramps, Etc.
  Go for aerobic activity (running, walking, biking, swimming, etc.), 3-5 days a week for 20 to 60 minutes, and start slow if you do not exercise regularly. To relieve cramps, use a heating pad or patch, take a hot bath or an over-the-counter pill (see your doctor first).
Irregular Periods
  When you first get your period, it can be irregular. Your body probably won't be on a regular schedule for a few months. Remember, you can still get pregnant even if your period is irregular. Make sure to use a reliable, proven birth control method if you are sexually active.
Vaginal Odor
  Some girls get an unpleasant odor during or after their period, which is normal. Odor can be due to sweat. To help prevent or reduce odor, try the following:
  Keep your privates clean and dry
  Avoid irritating soaps, and stick with bath and feminine hygiene products that are free of heavy perfumes.
  Change tampons and pads frequently.
  Wear loose cotton underwear (vs. synthetic fibers) that breathes.
  After swimming, change into dry clothing and don't sit around in your wet suit.
  If you still notice an icky smell, talk to your mom, school nurse, or other trusted adult, or see your doctor. It may be something you need to have checked."

There follows a step of describing typical problems encountered during a young woman's menstrual period and advising solutions:

"PERIOD PROBLEMS & SOLUTIONS

Rollercoaster hormone levels before and during your menstrual cycle can cause strange things to happen and are often symptoms of PMS (Premenstrual Syndrome):
  zits, food cravings, mood swings (Advice: saying little is best)
  Body Bloat (AKA the Beluga Blues)
  Cramps;
Take Command of Your PMS
Eat Smart
  Follow these recommended nutrition guidelines designed to alleviate menstrual cycle-related discomforts and cravings: Don't get all paranoid and stop eating; it's perfectly normal to feel bloated during your period. Spread out your regular daily amount of food across 6 meals. Eat 3 small meals+3 light snacks to avoid long periods of time without eating. Don't pig out! Resist caffeine including coffee, tea, colas, energy drinks and chocolate. Skip the salt—it causes bloating and swollen hands & feet. Avoid processed, fast, and junk foods, salt-loaded snacks and the salt shaker.

There follows a step of providing answers to common questions regarding menstruation and feminine hygiene products:

Q: I read on the Internet that there are toxic chemicals in tampons. Is this true?
A: No. Remember, the Internet is full of good and bad information. Government organizations like the FDA strictly monitor the production of tampons to ensure that they are free of harmful materials.

Q: Is rayon safe to use in tampons?
A: Yes. Like cotton and other plant fibers, rayon is "natural" and made from cellulose. It's been used in tampons for over 25 years. Extensive testing by several leading scientists at top American universities and the Centers for Disease Control (CDC) has demonstrated that rayon and cotton are equally safe materials.

Q: Can a tampon get stuck/lost inside the body or fall out?
A: No to all of the above. A tampon is held in place by the muscular walls of your vagina until you remove it. Your vagina ends at the cervix, the opening of which is much too small for a tampon to fit through, so it can't get lost in your body. If it feels a little hard to pull out, it's not stuck. Rather, it may be due to your tightening muscles (try to relax!) or a dry tampon. If the tampon has been in for less than 4 hours, you may want to leave it in longer, as it probably has not absorbed enough menstrual fluid to make it easy to pull out. And finally, your tampon won't fall out if inserted correctly, since the vaginal muscles will hold the tampon in place.

Q: What if the tampon string breaks?
A: A breaking tampon string is extremely rare. But if it does, wash hands, get into the position you use when inserting the tampon, and just pull it out with your fingers. If you can't, you should see your doctor ASAP.

Q: Is it safe to wear tampons overnight?
A: Yes, although not for longer than 8 hours. That's why we suggest a pad for sleeping.

Q: Can I wear a tampon during swimming and sports?
A: Yes. Go for it—sports including swimming, dancing, yoga—whatever. Tampons don't drift around your underwear like a pad can, plus they're discreet and ideal for active girls.

Q: Can I get pregnant during my period?
A: Yes, indeed. If you have a short menstrual cycle and a long period, you could get pregnant during your period. You ovulate about 14 days BEFORE the start of your next period, the most likely time for pregnancy to happen.

Q: Does a woman stop menstruating if she gets too thin?
A: Yes. Your body needs a minimum of fat to run a normal menstrual cycle. Major weight loss and very low body fat can shut down your period—this is called Amenorrhea. If this happens, see your doctor. Serious athletes and women with eating disorders are most prone to this condition."

Figure 7:
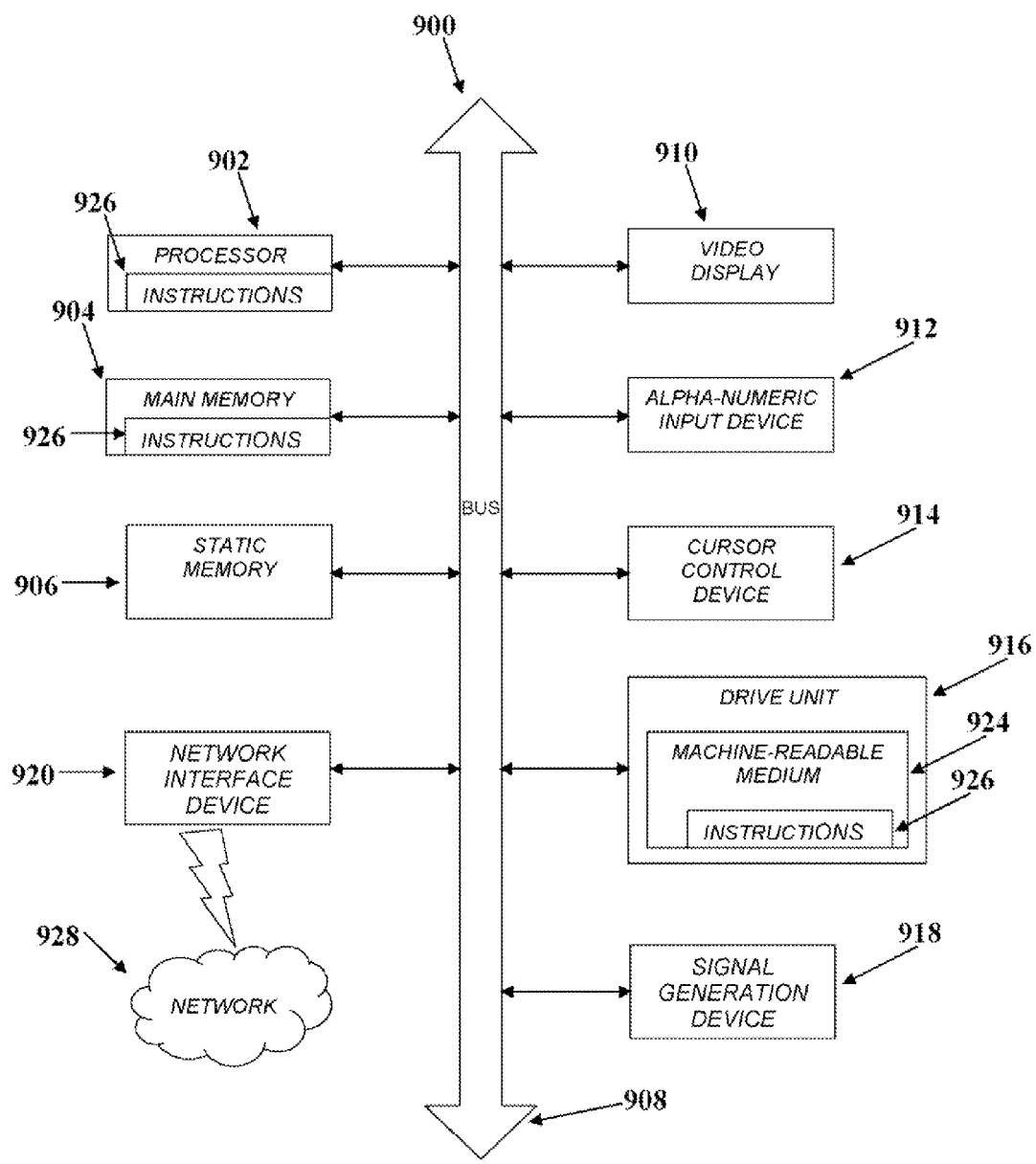
FIG. 7 shows a flow chart of a method of selecting a kit of absorbent articles for a consumer.

As described above, a method 700 for selecting a kit of absorbent articles for a consumer is implemented by means of a software-based expert system. Referring now to FIG. 7, a flowchart of the method as implemented by the expert system is shown:

After the entry point 701:
it is determined if the consumer has experienced her first menstrual period 702;
If she has not experienced her first menstrual period:
the expert system automatically recommends a cycle kit for girls containing an assortment of products in amounts specially suited to the needs of a girl experiencing her first menstrual period 703;
the expert system then proceeds to a series of informational steps. The information steps may be implemented in any of a variety of ways. The system may direct the girl to the information provided in the cycle kit itself. In another embodiment, the system provides the information in electronic documents that the girl can print out and read at a later time. In another embodiment, the information is provided on screen. In another embodiment, the information is provided in audio files, such as MP3 files for download. Another embodiment provides the information on a portable medium such as a CD. The additional informational steps may include:
describing the process of menstruation and answering common questions 704;
describing sanitary pads and their proper use 705;
describing tampons and their proper use 706;
describing toxic shock syndrome 707; and
providing instructions about selecting the most appropriate product for each stage of the girls' first menstrual period 708, after which the method terminates 709;
If she has experienced her first menstrual period:
the program collects personal information about cycle characteristics and use preferences 710;
the program evaluates the personal information and recommends a cycle kit based on the girl's cycle characteristics and use preferences 711;
the expert system then proceeds to a series of informational steps. As above, the information steps may be implemented by means of any of a number of different channels and media. The additional information steps may include:
describe tampon proper tampon use and associate risks 712;
provide advice about personal care and hygiene during period 713;
describe typical problems encountered during period and advise solutions 714;
answer additional common questions using a Q & A format 915; and
the method terminates 916.

The preceding description of a method for selecting a kit of absorbent articles for a consumer is primarily illustrative. In actual fact, the method may include more steps than shown, or fewer steps. Or the steps may occur in a different order shown. Additionally, some of the steps may be combined, so that a plurality of the steps given above are performed in a single operation.

Because the above method is embodied as an expert system, the information steps, in particular, can be implemented in a highly interactive manner, customized to the particular consumer. For example, the system can elicit the girl's age. Based on the age given, the software can calibrate the reading difficulty of the information provided to the girl's age, thus increasing the chance that the information is understood and benefits the girl. Additionally, if additional information resources are recommended, the particular assortment of resources can be made age-appropriate. Moreover, the expert system can query whether or not the girl needs or desires additional information. Upon receiving a "no" answer, the software can terminate the process without performing any of the information steps at all.

The software can elicit from the girl what problems she is experiencing and what questions she has. Thus, the software, in highly-interactive fashion, can adjust and customize the information content to the girl's particular needs.

Figure 8:
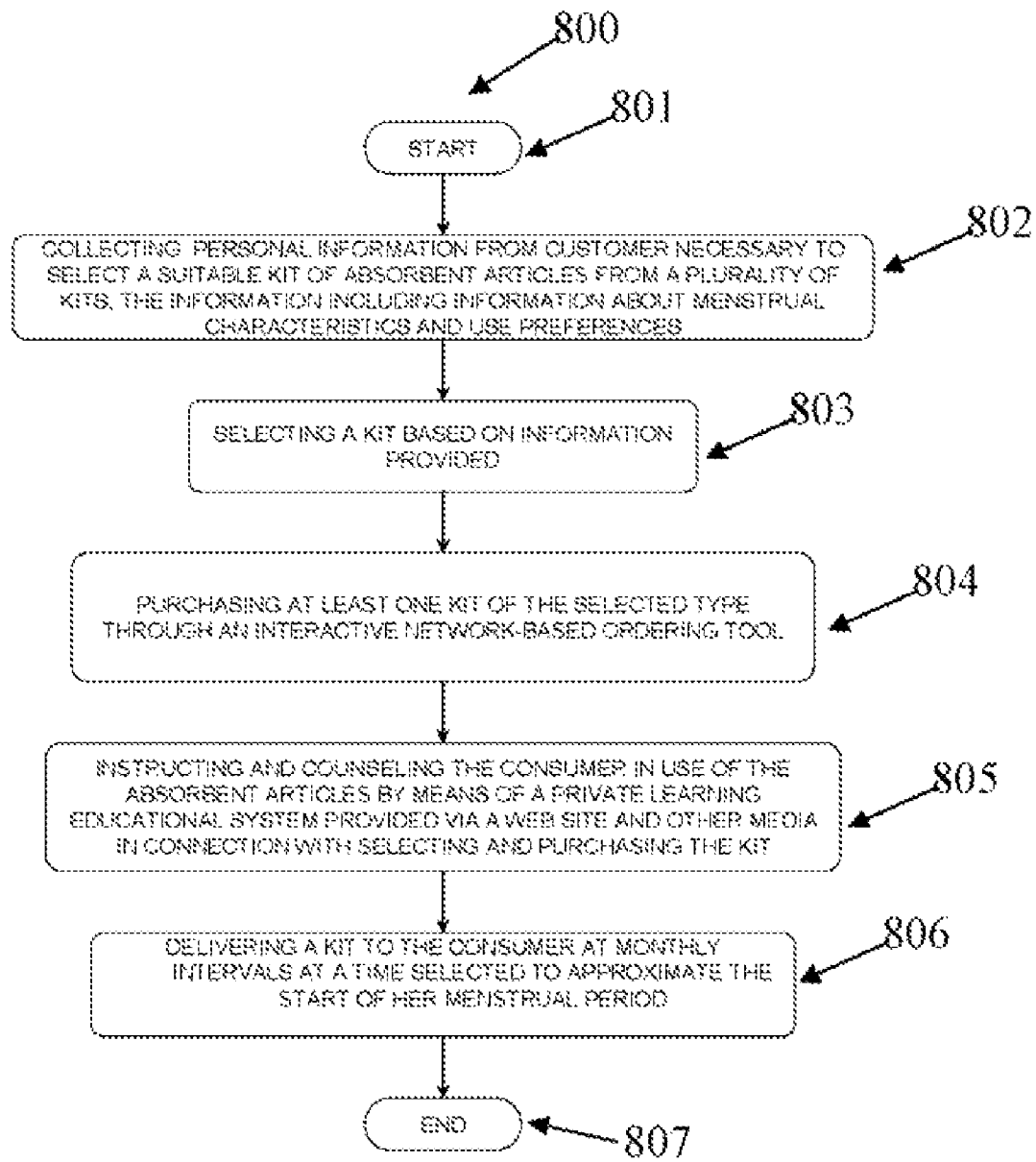
FIG. 8 shows a flow chart of a method for providing absorbent articles to consumers.

As shown in FIG. 8, a method 800 for instructing, educating, dispensing and packaging at least two different types of feminine hygiene and intimate hygiene products is described herein. In general, such method includes one or more of the following steps:

collecting personal information from customer necessary to select a suitable kit of absorbent articles from a plurality of kits, the information including information about menstrual characteristics and use preferences (802);
selecting a kit based on information provided (803);
purchasing at least one kit of the selected type through an interactive network-based ordering tool (804);
instructing and counseling the consumer in use of the absorbent articles by means of a private learning educational system provided via a web site and other media in connection with selecting and purchasing the kit (805); and
delivering a kit to the consumer at monthly intervals at a time selected to approximate the start of her menstrual period (806).

The various steps of the method of FIG. 8 are described in greater detail infra. It is to be appreciated that the step of kit selection 803 above substantially embodies the selection method shown in FIG. 7 and described supra.

Figure 9:
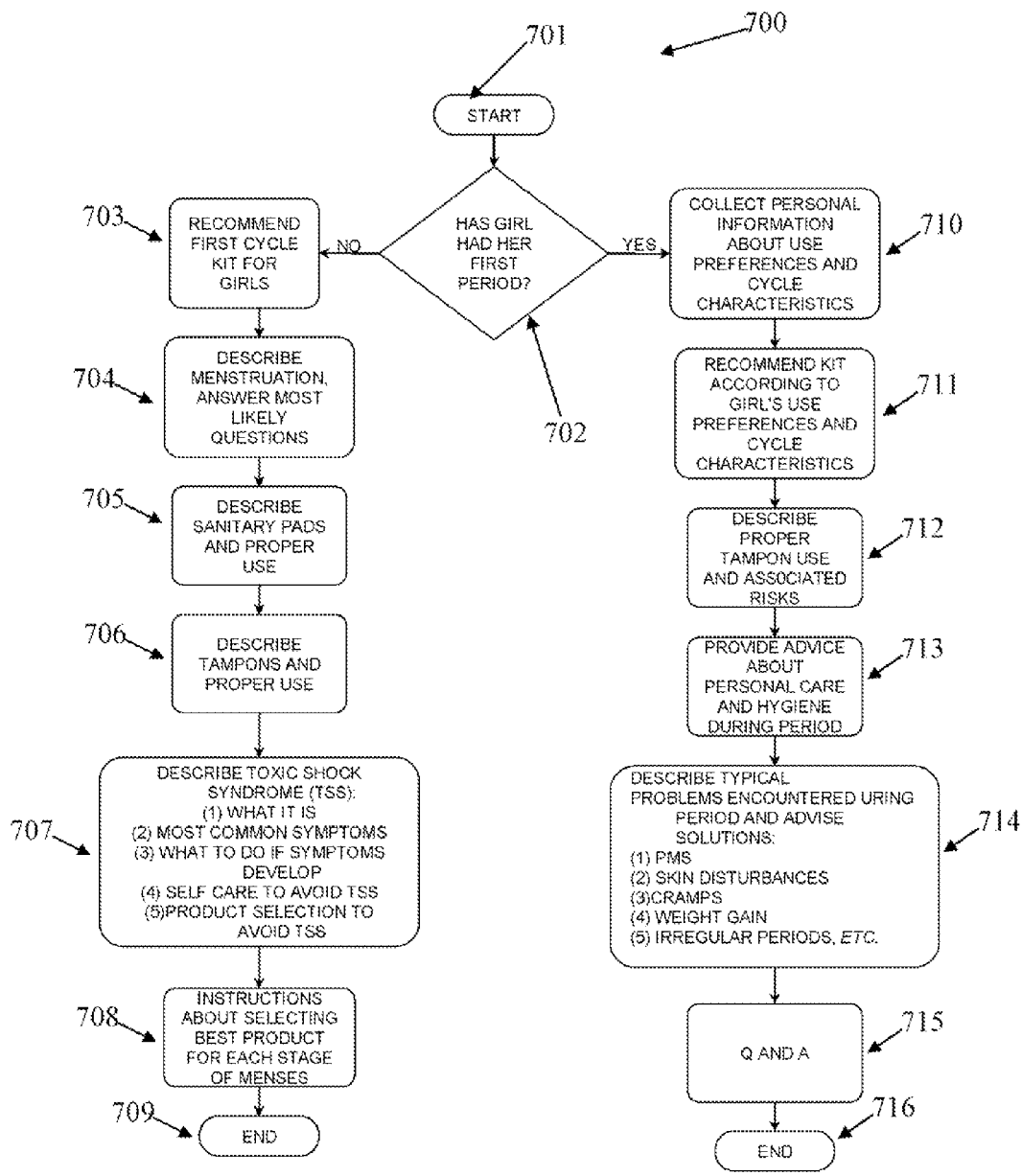
FIG. 9 provides a diagram of a machine in the exemplary form of a computer system within which a set of instructions, for causing the machine to perform any one of the methodologies discussed herein, may be executed.

FIG. 9 shows a diagrammatic representation of a machine in the exemplary form of a computer system 900 within which a set of instructions, for causing the machine to perform any one of the methodologies discussed herein above and below, may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a display unit 910, for example, a liquid crystal display (LCD) or a cathode ray tube (CRT). The computer system 600 also includes an alphanumeric input device 912, for example, a keyboard; a cursor control device 914, for example, a mouse; a disk drive unit 916, a signal generation device 918, for example, a speaker, and a network interface device 920.

The disk drive unit 916 includes a machine-readable medium 924 on which is stored a set of executable instructions, i.e. software, 926 embodying any one, or all, of the methodologies described herein below. The software 926 is also shown to reside, completely or at least partially, within the main memory 904 and/or within the processor 902. The software 926 may further be transmitted or received over a network 928 by means of a network interface device 920.

In contrast to the system 900 discussed above, a different embodiment of the invention uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infra-red signals, digital signals, etc.; or any other type of media suitable for storing or transmitting information.

Figure 10:
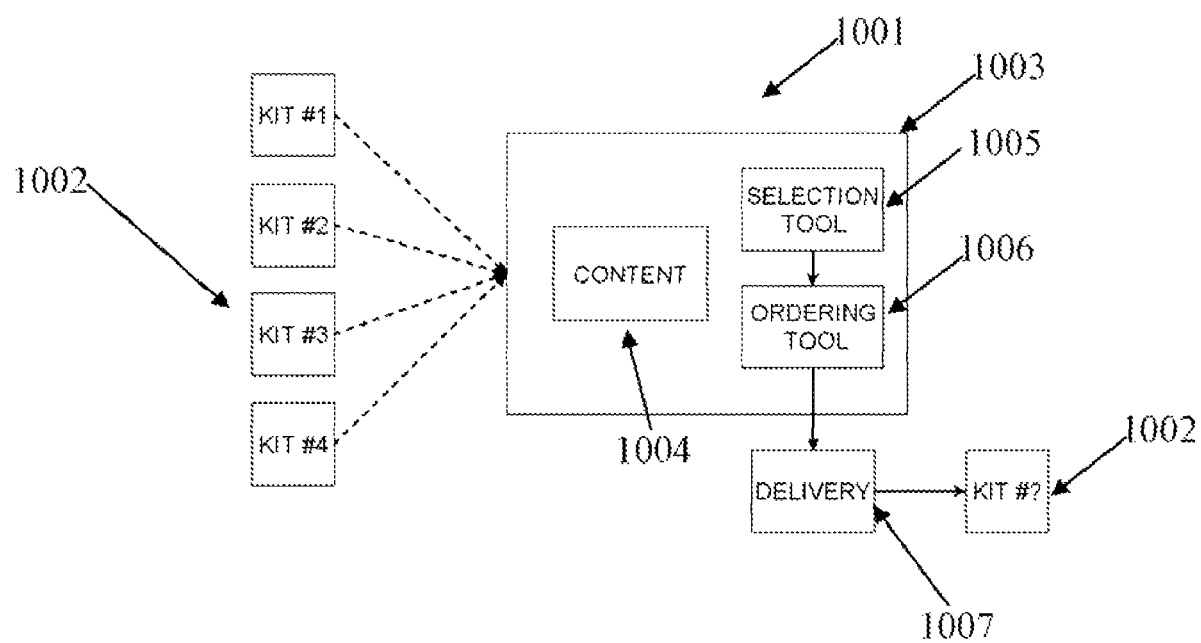
FIG. 10 shows a block diagram of a system for providing absorbent articles to consumers.

Turning now to FIG. 10, shown is a network-based system for providing a kit of absorbent articles to a consumer. Using the system 1001, a girl or young woman can learn which of kits 1002 is best-suited for her. In one embodiment, the system includes a web site 1003, which web site is described in greater detail infra. Incorporated within the web site are a selection tool 1005 for selecting a kit. An embodiment of the selection tool 1005 incorporates the expert system described supra. Advantageously, the consumer, having been recommended the most appropriate cycle kit, can then, by means of an ordering tool 1006, place an order for the cycle kit 1002. The ordering tool 1006 is described in greater detail in connection with the description of the web site. The cycle kit 1002 is then delivered 1007 in a timely fashion, via any of a variety of channels, for example through the mail, or by means of any of a number of private carriers. The web site also includes content 1004 as described supra. In addition, the content can include a broad range of lifestyle information targeted to the needs and interests of girls and young women. More will be said about the content infra.

The system 1001 is preferably implemented over a publicly-accessible data communication network such as the Internet. While the content 1004, selection tool 1005 and ordering tool 1006 are shown and described as being incorporated into a web site, one embodiment of the invention distributes the various elements of the system across a plurality of servers: the web site preferably resides on a web server; both the selection and ordering tools preferably reside on one or more application servers communicatively coupled to the web server. The selection and ordering tools, in turn, preferably interact with a data store of customer, transaction and product data housed on one or more database servers communicatively coupled to the one or more application servers. The content preferably resides on one or more content servers communicatively coupled to the web server. In one embodiment, the invention is implemented using XML (extensible markup language) and SOAP (simple object access protocol).

While the preceding embodiment is described as having been implemented across a plurality of servers, the servers may in fact reside on a single computer, or they may be distributed across a plurality of computers in a variety of configurations. Other methods of implementing the system of the invention will occur to the ordinarily-skilled artisan and are consistent with the spirit and scope of the invention.

Figure 11:
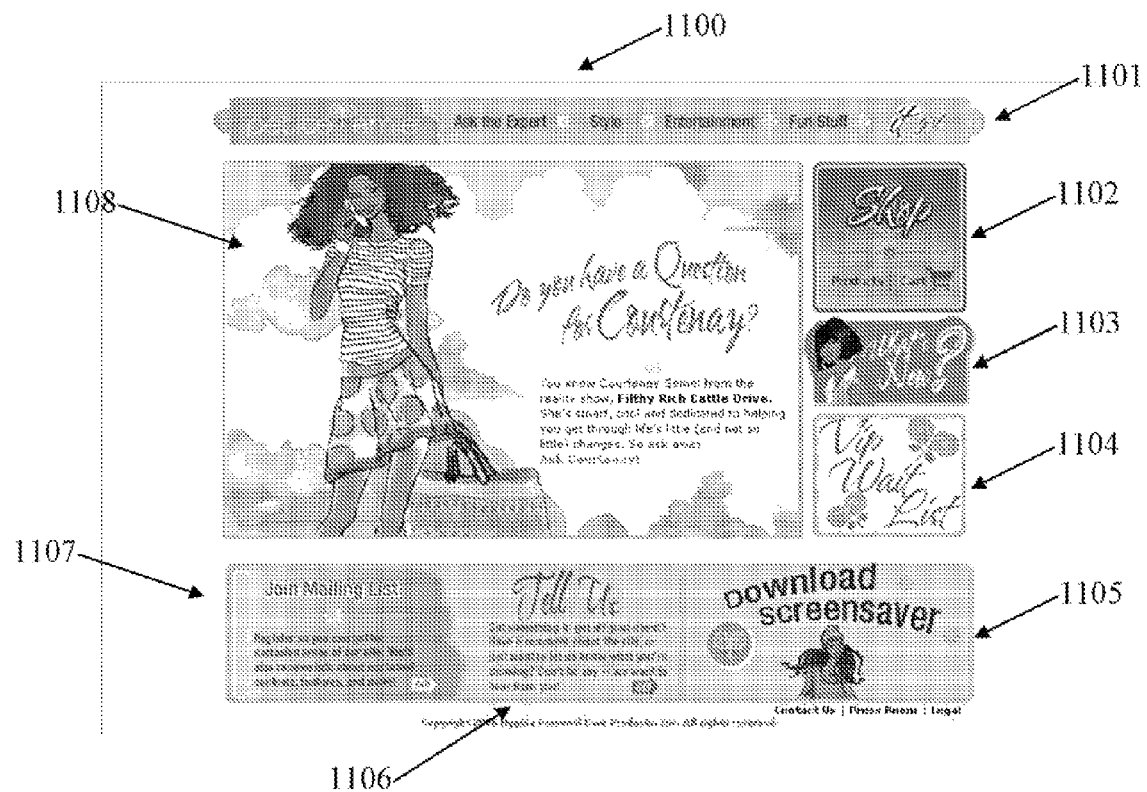
FIG. 11 shows a home page from a web site for providing absorbent articles to a consumer.

Referring now to FIG. 11, shown is a screen shot of a home page from a web site for providing absorbent articles to a consumer. An embodiment of the invention is designed specifically to accommodate girls approaching puberty and young women. Accordingly, the images and art on the web site are calculated to appeal to young women in these age groups and convey an image of fun and glamour. The web page includes a menu 1101 by which a visitor can quickly navigate to the various sections and features of the site. An exemplary menu 1101 includes the options:

'Ask the Expert;'
Style;
Entertainment;
'Funstuff;' and
'It Girl.'

The home page 1100 further includes a graphical link 1102 to a cycle kit ordering tool.

A 'What's new?' feature 1103 alerts site visitors to new features and new content on the site.

A 'VIP Wait list' feature 1104 allows site visitors to place their names on a waiting list to receive new products and services as soon as they become available.

A 'Download Screensaver' feature 1105 allows a site visitor to download a screensaver. In one embodiment, the screensaver is branded.

A 'Tell Us' feature 1106 is provided for site visitors to communicate feedback concerning the site, the service and/or the product.

A 'Join Mailing List' feature 1107 allows site visitors to register and be placed on an email list. By registering, the site visitor is preferably granted access to members-only content.

A feature 1108 is provided wherein site visitors can direct questions to celebrities. Thus, a girl or young woman may ask the celebrity to provide an answer or an opinion about a concern or problem personal to the girl.

Figure 12:
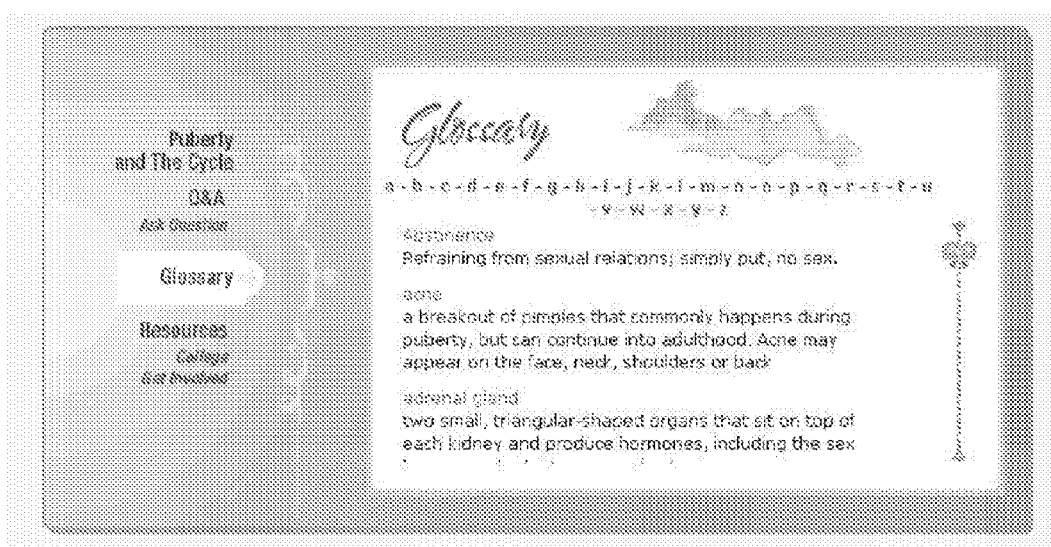
FIG. 12 shows a page providing a glossary of terms from the web site of FIG. 11.

By selecting the 'Ask the Expert' menu option, the site visitor is navigated to a menu of information sources related to health issues important to young women. As shown in FIG. 12, the menu, shown in a first window, includes the options:

'Puberty and the Cycle;'
'Q & A: Ask Question;'
'Glossary;' and
'Resources: College, Get Involved.'

In a second window 1200, a glossary of terms related to young women's' health issues is shown.

Figure 13:
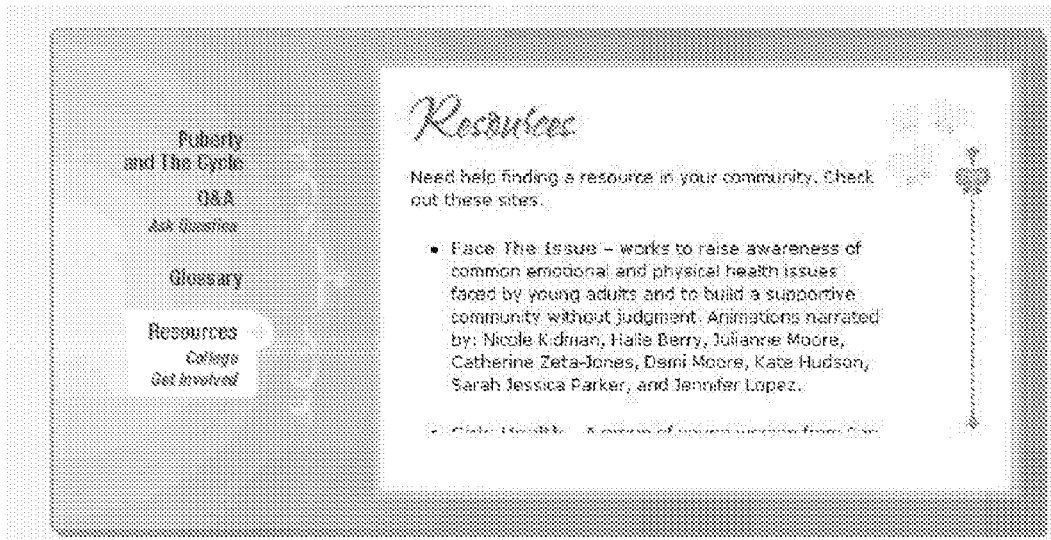
FIG. 13 shows a page providing a links to additional sources of information from the web site of FIG. 11.

FIG. 13 shows a view of a page 1300 that provides links to other resources relating to, for example, family life, emotional and mental health and school.

Figure 14:
FIG. 14 shows a page providing an overview description of puberty and the onset of menses from the web site of FIG. 11.

FIG. 14 shows a view of a page 1400 that provides information about puberty and the menstrual cycle.

Figure 15:
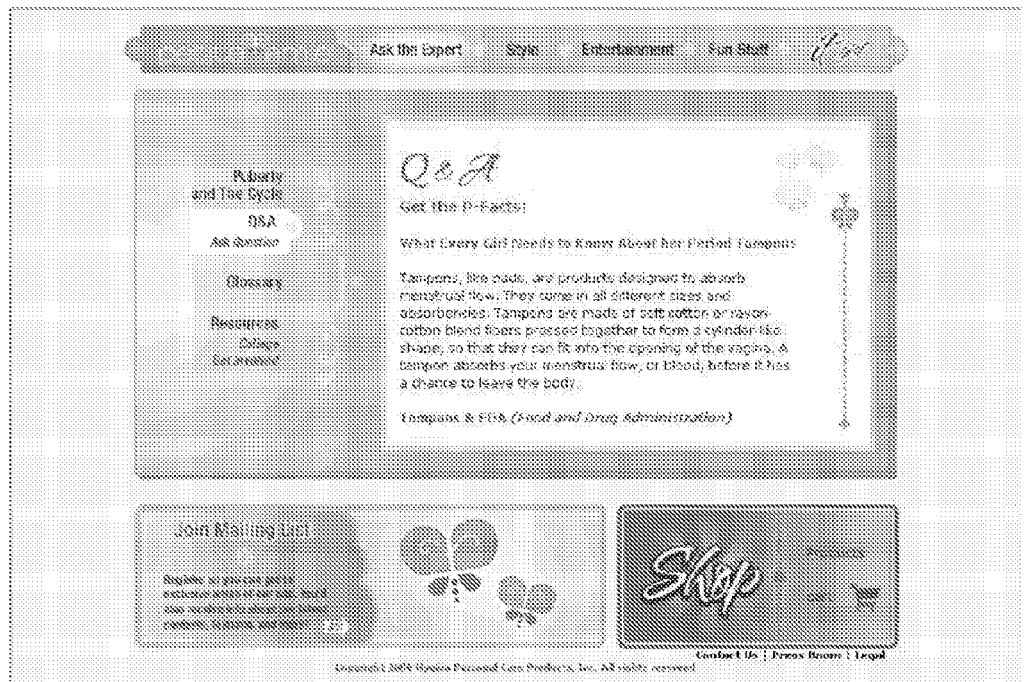
FIG. 15 shows a question-and-answer page from the web site of FIG. 11.

FIG. 15 shows a view of a page 1500 that provides answers to common questions about menstruation, feminine hygiene, and young women's health in question-and-answer format.

Figure 16:
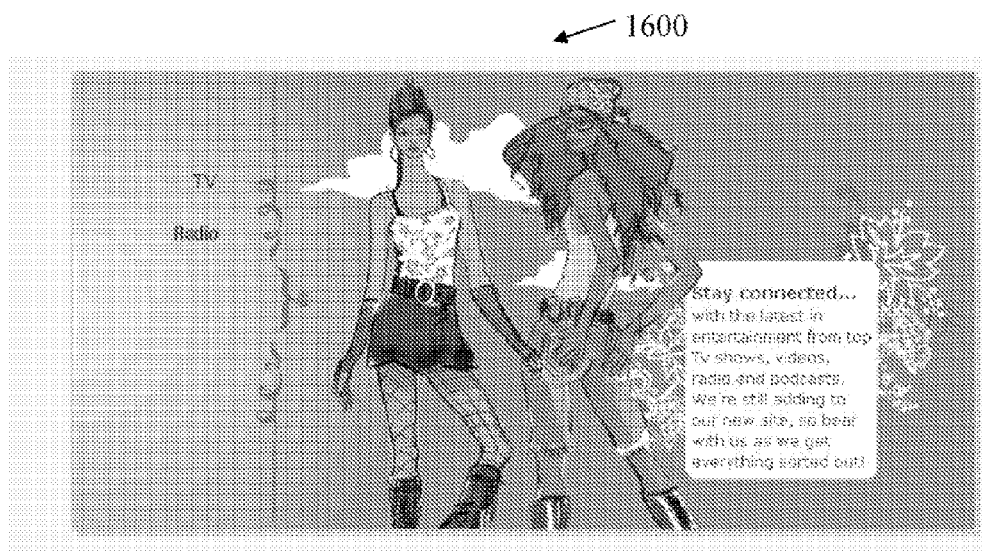
FIG. 16 shows a page from the web site of FIG. 11 providing links to various sources of lifestyle information such as television and radio entertainment.

FIG. 16 shows a view of a page 1600 that gives up-to-date information about various entertainment sources such as TV, movies, radio and podcasts.

Figure 17:
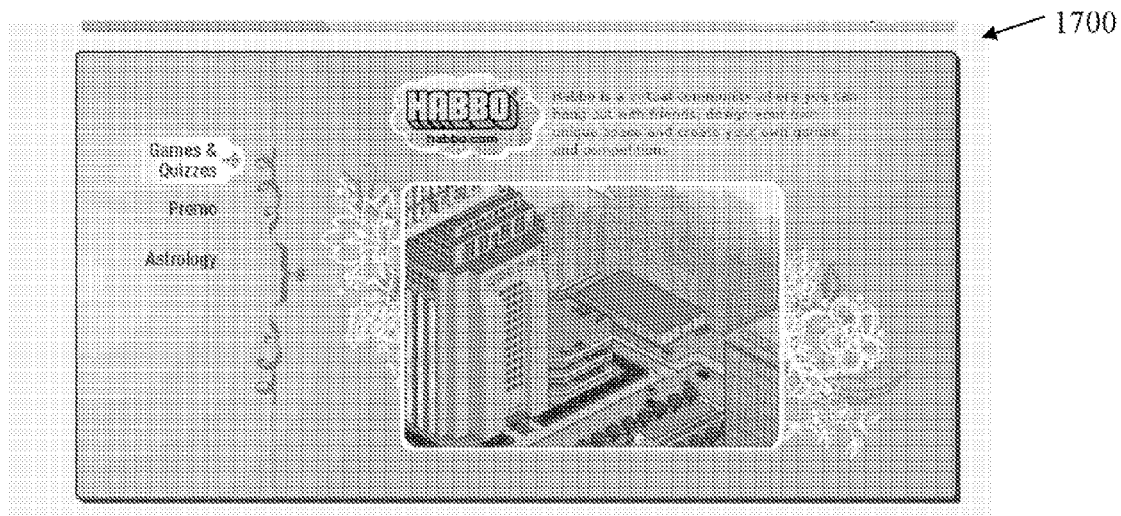
FIG. 17 shows a "games and quizzes" page from the web site of FIG. 11.

FIG. 17 shows a view of a 'games and quizzes' page 1700.

Figure 18:
FIG. 18 shows a page of young women's health information from the web site of FIG. 11.

FIG. 18 shows a view of a 'health' page 1800.

Figure 19:
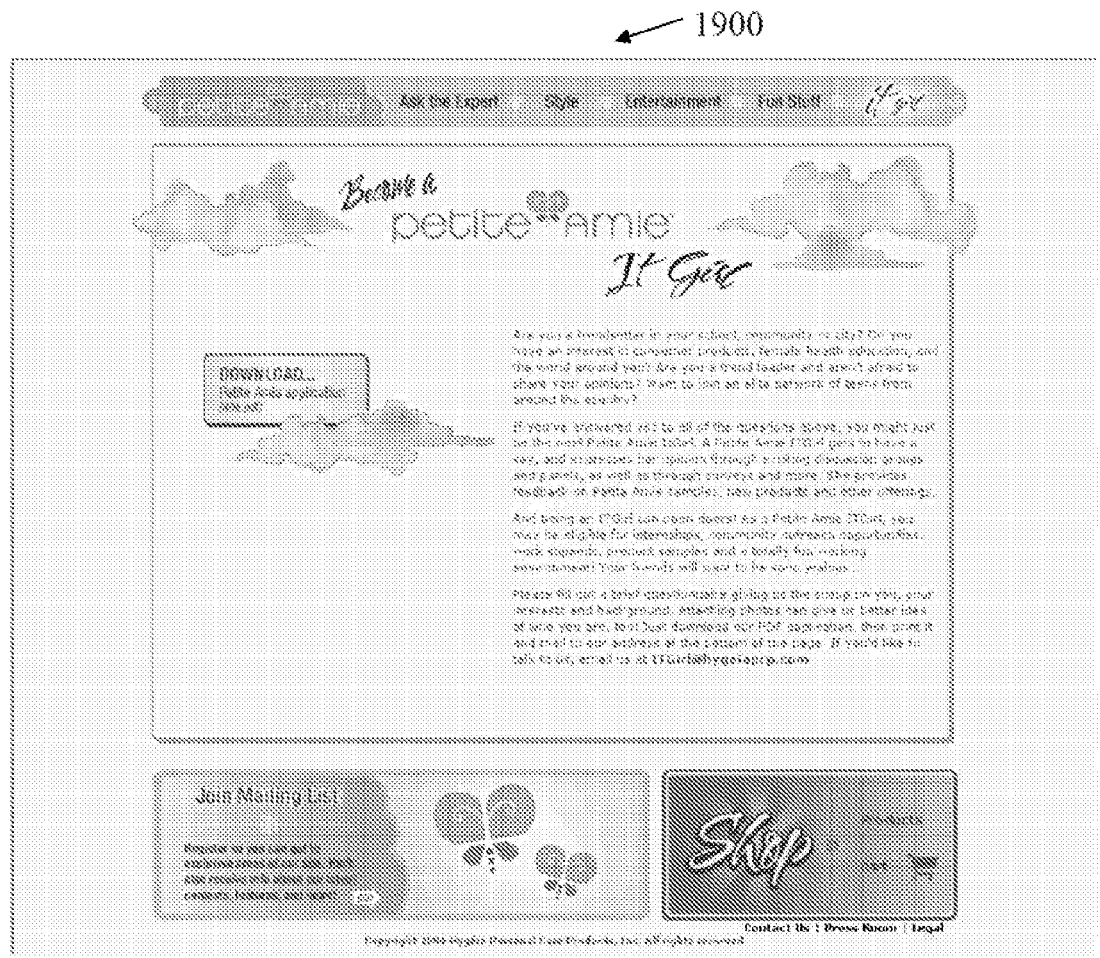
FIG. 19 shows a page from the web site of FIG. 11 for recruiting young women to be consumer advisors to manufacturers and distributors of absorbent articles.
Figure 20:
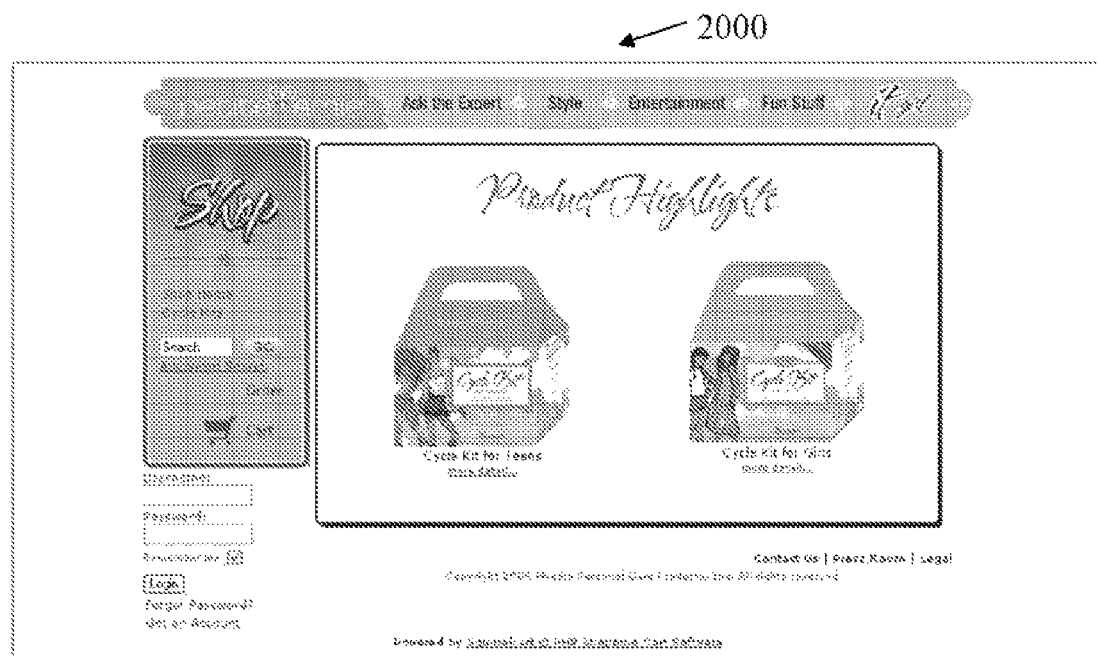
FIG. 20 shows a first page from an ordering tool for kits of absorbent articles from the web site of FIG. 11.

FIG. 19 shows a view of a page recruiting 'It Girls.' The 'It Girl' is preferably a user of the site provider's cycle kits and serves as a consumer advisor and consultant to the cycle kit manufacturer.

By activating the link 1102 to the cycle kit ordering tool, the consumer is navigated to a first page 2000 that provides preliminary product information and, also, text entry boxes for logging on.

Figure 21:
FIG. 21 shows a product information page from the ordering tool of FIG. 20.
Figure 22:
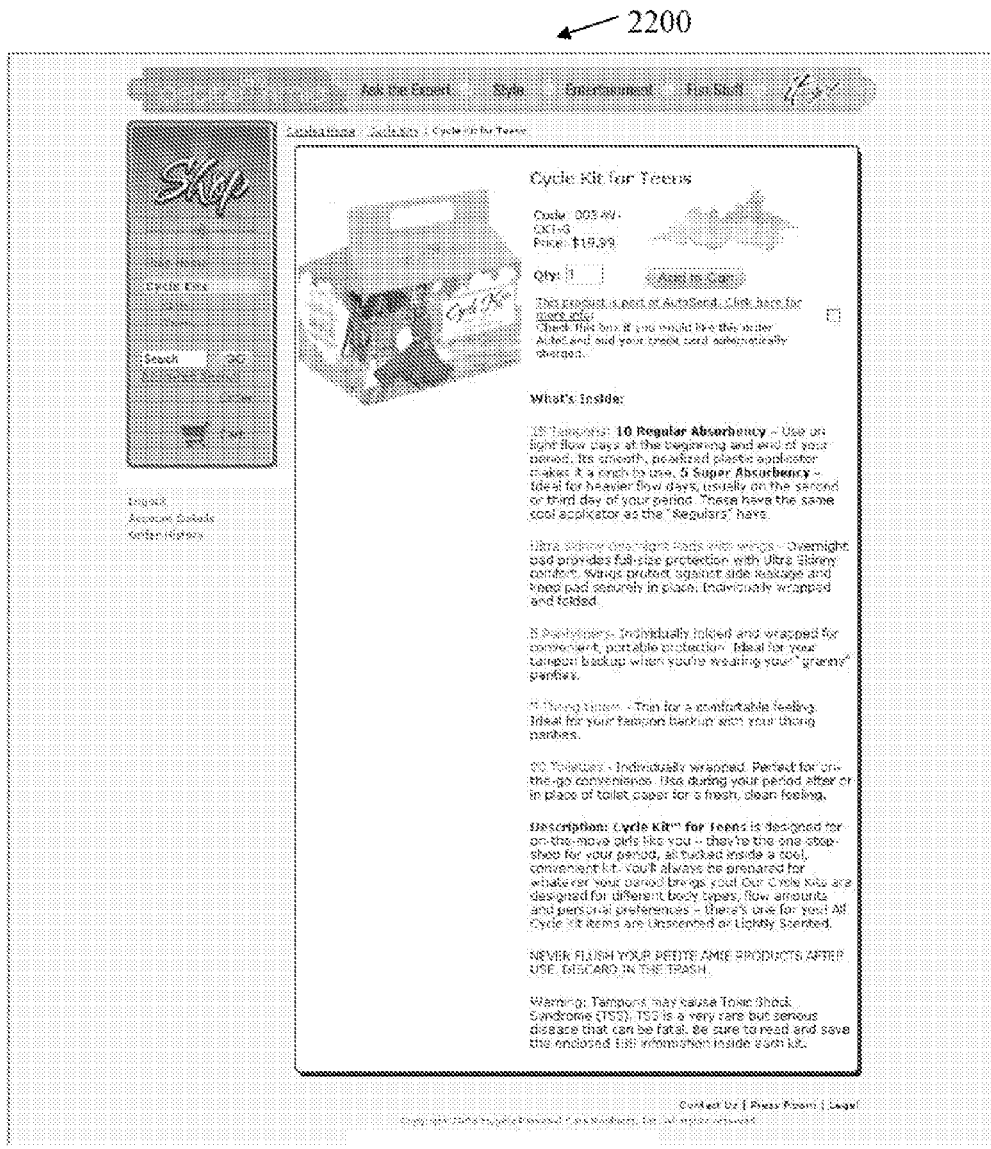
FIG. 22 shows a product detail page from the ordering tool of FIG. 20.
Figure 23:
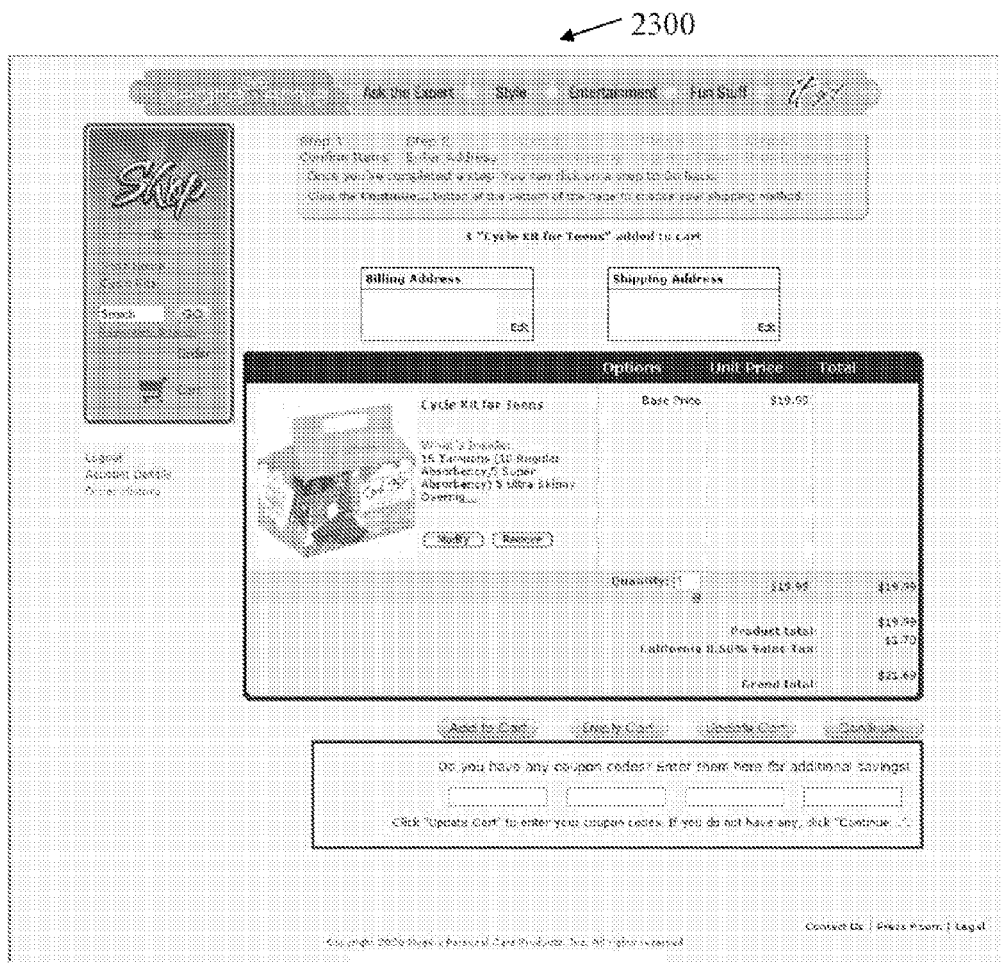
FIG. 23 shows an order page from the ordering tool of FIG. 20.

As shown in FIG. 21, second product information page 2100 gives information about each of the cycle kits, including the product assortment and the price. A link for each product navigates the consumer to an order page 2200 for the respective cycle kit.

In one embodiment, each cycle kit has its own ordering page 2200. The ordering page 2200 includes: detailed information about the products included in the kit; advice on the proper use and selection of the various products; a data entry field wherein the consumer specifies the number of kits to order; a button that adds the specified number of kits to the consumer's shopping kit; and a checkbox that allows the consumer to select an "autosend" option, which is described in greater detail infra.

After adding the products to the shopping cart, the consumer is navigated to an invoice page 2300. An invoice provides a detailed description of the transaction, specifying the type and quantity of product ordered, the unit price, the product total, sales tax, if applicable and a grand total. If the consumer has previously registered and logged on, her billing and shipping addresses are automatically filled in from her profile. If she is not a site member, or if she has not logged on, she manually fills in the address fields of the invoice form. Beyond address entry, the transaction includes the additional steps of: choosing a shipping method, confirming the total, and submitting payment. In one embodiment of the invention, at the time of registration, the consumer can add a credit card to her membership profile. When she checks out, the credit card information is automatically retrieved from her profile. If the purchaser is not a registered member, she is asked to supply a credit card at checkout.

Figure 24:
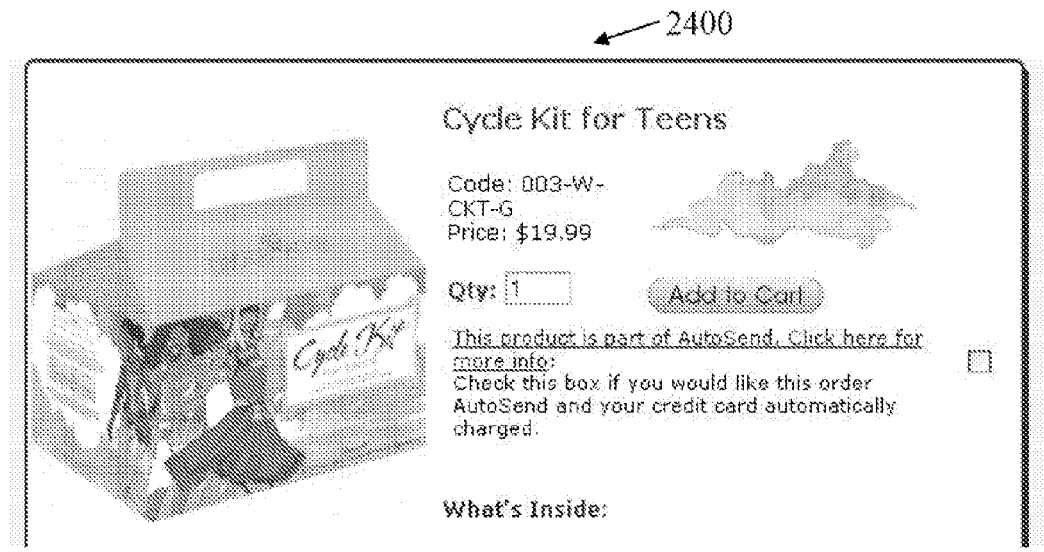
FIG. 24 shows a page from the ordering tool of FIG. 20 providing a control for configuring an auto-send option.
Figure 25:
FIG. 25 shows a page from the ordering tool of FIG. 18 describing an auto-send option.

Advantageously, an embodiment of the invention provides an 'autosend' option. As shown in FIG. 24, the order page includes a link to a description of the 'autosend' option, and a checkbox, wherein the consumer is able to select the 'autosend' option. By selecting the link, the consumer is navigated to a description of the 'autosend' option. By selecting this option, the consumer is spared the necessity of making repeated purchases of product. The proper kit is automatically shipped to the consumer on a monthly basis and her account is charged on a monthly basis. A particular advantage of the 'autosend' option is that the consumer, when requesting the service, specifies the date of the month around which her menstrual period customarily commences. The appropriate cycle kit is shipped to her every month at a date that approximates the onset of her cycle. In this way, the consumer purchases and receives just-in-time delivery of a month's supply of absorbent products. Thus, the consumer is spared the inconvenience and embarrassment of purchasing supplies from bricks-and-mortar retailers and need not purchase and keep on hand multiple large packages of product.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A method of providing absorbent articles to a consumer comprising the steps of:
   collecting personal information from said consumer necessary to select a kit suited to her needs from a plurality of kits, said personal information including at least information about any of said consumer's menstrual cycle characteristics and her use preferences;
   selecting a kit for said consumer based on said information via a computer, wherein said kit comprises a combination of different types of absorbent articles such that each type of absorbent article is coordinated with a different phase of said menstrual cycle, wherein each of the types of absorbent articles has an arrangement within said package which is instructive as to a sequence of use of said absorbent articles correlating to a progression of the menstrual cycle;
   purchasing at least one kit of said selected kit type by said consumer through an interactive, network-based ordering tool for absorbent products provided in a web site; and,
   instructing and counseling said consumer in use of said articles by a private learning educational system provided in connection with selecting and purchasing said kit, said private learning system provided at least in part by said web site.

2. The method of claim 1, wherein said consumer comprises either of:
   girls approaching their first menstrual period; and adolescent women.

3. The method of claim 1, wherein said step of collecting personal information from said consumer comprises the steps of:
   providing an interactive rule-based selection tool comprising means for entering said information about any of said consumer's menstrual cycle characteristics and her use preferences;
   entering said information by said consumer; and
   evaluating said information; and
   wherein said step of selecting a kit based on said information comprises the step of recommending a kit suited to said consumer's menstrual cycle characteristics and use preferences based on said entered, evaluated information;
   wherein said interactive rule-based selection tool is either of a network-based tool provided as part of said website and a point-of-sale terminal programmed to accept said consumer's input, evaluate it, and recommend a suitable kit.

4. The method of claim 1, wherein each of said kit includes a distinct assortment of types of absorbent articles comprising any of:
   at least one pad;
   at least one panty liner;
   at least one interlabial device
   at least one tampon; and
   at least one toilette;
   wherein each assortment targets a particular cluster of needs and preferences including fluctuating menstrual flow as a menstrual period progresses.

5. The method of claim 1, wherein said kit types are configured based at least partially on said consumer's ethnicity or preferences characteristic of said consumer's ethnicity.

6. The method of claim 1, wherein said kit comprises:
 a package containing a plurality of separate absorbent articles in an assortment customized to a particular consumer type based at least on said menstrual cycle characteristics and preferences, wherein said package has either a substantially rigid, box-like structure or a soft-sided, bag-like structure.

7. The method of claim 1, wherein said kit comprises a compact containing a day's worth of absorbent articles in a combination of any of:
 at least one pad;
 at least one pad;
 at least one panty liner;
 at least one inter-labial device;
 at least one tampon; and
 at least one toilette.

8. The method of claim 1, further comprising the step of:
 customizing a kit to a single customer based on any of her unique menstrual cycle characteristics and her use preferences.

9. The method of claim 1, wherein said kit comprises either of:
 a refill; and
 a sample kit, said sample kit comprising a single-use package containing a single one of each type of absorbent product.

10. The method of claim 1, wherein said step of delivering said at least one kit to said consumer comprises the steps of
 obtaining by means of an 'autosend' feature in said ordering tool the approximate monthly date of onset of said consumer's menstrual period; and
 providing, on an ongoing basis, just-in-time delivery of a kit containing approximately the number of items of each product needed for a single menstrual period.

11. The method of claim 1, further comprising the step of:
 providing dispensing systems for said absorbent articles in public rest rooms.

12. The method of claim 1, wherein said ordering tool comprises:
 means for selecting items;
 an 'autosend' feature;
 means for entering shipping and billing addresses;
 means for selecting a shipping method;
 means for confirming an order; and
 means for submitting payment.

13. The method of claim 1, wherein said web site comprises:
 means for providing women's health information including information for girls regarding onset of puberty and menstruation;
 means for submitting questions related to puberty and menstruation and receiving expert answers;
 means for submitting health and lifestyle questions and receiving answers from celebrities or community leaders;
 means for providing lifestyle information targeted to girls and adolescent women;
 online community features;
 at least one message board;
 means for providing chat rooms;
 a menstrual period calculator;
 means for providing interactive games;
 means for providing interactive quizzes;
 a privacy notice; and
 means for providing online versions of printed matter included with said kit.

14. The method of claim 1, wherein said private learning educational system comprises any of:
 printed matter included with said kit;
 printed matter provided separately from said kit;
 online versions of said printed matter provided with said kit and separately from said kit;
 in-school and after-school programs;
 CDs;
 DVDs;
 MP3s;
 online tools;
 school ambassadors; and
 peer leaders.

15. The method of claim 1, further comprising the step of recruiting consumers to provide product feedback though any of:
 discussion groups;
 panels; and
 surveys.

16. The method of claim 1, further comprising the step of distributing kits through bricks-and-mortar retailers.

17. The method of claim 16, wherein said bricks-and-mortar retailers comprise retailers of any of:
 cosmetics;
 beauty products;
 hair care products
 high fashion women's apparel and lingerie;
 institutional distributors;
 grocery stores;
 drugstores; and
 discount stores.

18. A system for distributing a kit of absorbent articles to a consumer comprising:
 a plurality of kits in a plurality of types, a kit comprising a package containing a plurality of separate absorbent articles of a plurality of different types in an assortment such that each type of absorbent article is coordinated with a particular consumer profile and with a different phase of a menstrual cycle and use preferences;
 wherein said absorbent articles are disposed within said package in an arrangement which is instructive as to a sequence of use of said absorbent articles correlating to a progression of the menstrual cycle;
 means for obtaining personal information from said consumer regarding characteristics of her menstrual cycle and her use preferences;
 an interactive, rule-based selection tool that evaluates said personal information and issues a kit recommendation based on said information;
 an interactive ordering tool wherein said consumer orders at least one of said kits, wherein said ordering tool provides an 'autosend' option that ships a kit to said consumer on a monthly basis timed to approximate onset of her menstrual cycle;
 a processor and memory in communication with the processor, where the processor evaluates said personal information; and,
 a web site, wherein said selection tool and said ordering tool are associated with said web site, and wherein said consumer interacts with said selection tool and said ordering tool by means of said web site.

19. The method of claim 1, further comprising delivering said at least one kit to said customer.

* * * * *